United States Patent
Baldemair et al.

(10) Patent No.: US 11,206,691 B2
(45) Date of Patent: *Dec. 21, 2021

(54) TECHNIQUE FOR PERFORMING A RANDOM ACCESS PROCEDURE OVER A RADIO INTERFACE

(71) Applicant: Telefonaktiebolaget LM Ericsson (publ), Stockholm (SE)

(72) Inventors: Robert Baldemair, Solna (SE); Maria Edvardsson, Järfälla (SE); Erik Dahlman, Bromma (SE); Jacobus Cornelis Haartsen, BG Hardenberg (NL); Stefan Parkvall, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/691,877

(22) Filed: Nov. 22, 2019

(65) Prior Publication Data
US 2020/0107376 A1  Apr. 2, 2020

Related U.S. Application Data

(63) Continuation of application No. 14/644,327, filed on Mar. 11, 2015, now Pat. No. 10,492,226, which is a
(Continued)

(30) Foreign Application Priority Data

Oct. 21, 2005  (SE) .................................... 0502349-4

(51) Int. Cl.
*H04J 3/06*  (2006.01)
*H04W 74/08*  (2009.01)
(Continued)

(52) U.S. Cl.
CPC ...... *H04W 74/0833* (2013.01); *H04B 7/2681* (2013.01); *H04W 56/001* (2013.01);
(Continued)

(58) Field of Classification Search
CPC .................................................. H04W 74/0833
See application file for complete search history.

(56) References Cited

U.S. PATENT DOCUMENTS 5,502,721 A  3/1996 Pohjakallio
5,502,725 A  3/1996 Pohjakallio
(Continued)

FOREIGN PATENT DOCUMENTS

CN  1421076 A  5/2003
CN  WO 2004102833 A1  11/2004  .......... H04W 52/383
(Continued)

OTHER PUBLICATIONS

European Patent Register for European Patent No. EP1952560; European Patent Application 06 828 846.3 based on International Patent Application No. PCT/EP2006/010163; Specification, Claims, Abstract, and Annex for Patent Application entitled "Technique for Performing a Random Access Procedure over a Radio Interface"; 28 pages, Oct. 20, 2006.
(Continued)

*Primary Examiner* — Guang W Li
(74) *Attorney, Agent, or Firm* — Baker Botts, LLP

(57) ABSTRACT

The invention relates to a technique for performing a random access procedure over a radio interface, for example between a mobile terminal and a radio base station of a mobile network. A method aspect of the invention comprises the steps of transmitting a synchronization request for synchronization information; receiving synchronization information in response to the synchronization request; and transmitting, based on at least one transmission parameter
(Continued)

adjusted in accordance with the synchronization information, a resource request for data transmission resources.

18 Claims, 7 Drawing Sheets

Related U.S. Application Data continuation of application No. 13/950,546, filed on Jul. 25, 2013, now Pat. No. 10,219,302, which is a continuation of application No. 12/091,055, filed as application No. PCT/EP2006/010163 on Oct. 20, 2006, now Pat. No. 8,503,426.

(51) Int. Cl.
  *H04B 7/26* (2006.01)
  *H04W 56/00* (2009.01)
  *H04W 72/04* (2009.01)
  *H04W 72/12* (2009.01)

(52) U.S. Cl.
  CPC ... *H04W 56/0045* (2013.01); *H04W 72/0413* (2013.01); *H04W 72/1268* (2013.01); *H04W 74/0891* (2013.01); *H04J 3/0605* (2013.01)

(56) References Cited

U.S. PATENT DOCUMENTS

| | | | |
|---|---|---|---|
| 5,509,016 A | 4/1996 | Muller | H04B 7/2681 340/4.2 |
| 5,625,872 A | 4/1997 | Sawyer | |
| 5,828,662 A * | 10/1998 | Jalali | H04W 56/0085 370/335 |
| 5,943,334 A | 8/1999 | Buskens et al. | |
| 6,005,854 A | 12/1999 | Xu et al. | |
| 6,160,805 A | 12/2000 | Averbuch et al. | |
| 6,215,782 B1 | 4/2001 | Buskens et al. | |
| 6,292,494 B1 | 9/2001 | Baker et al. | |
| 6,330,446 B1 | 12/2001 | Mori | |
| 6,657,977 B1 | 12/2003 | Norman et al. | |
| 6,714,524 B1 | 3/2004 | Kim | H04W 56/001 370/335 |
| 6,721,787 B1 * | 4/2004 | Hiscock | H04W 4/00 709/217 |
| 6,778,509 B1 | 8/2004 | Ravishankar | H04B 7/18589 370/322 |
| 6,978,135 B2 | 12/2005 | Sasada | |
| 7,286,841 B2 | 10/2007 | Sun et al. | |
| 7,336,638 B2 | 2/2008 | Cheng | H04W 52/383 370/278 |
| 7,680,834 B1 | 3/2010 | Sim-Tang | |
| 7,818,433 B2 | 10/2010 | Dierks, Jr. | H04L 41/5019 709/227 |
| 7,912,518 B2 | 3/2011 | Uh et al. | |
| 8,085,694 B2 | 12/2011 | Wu et al. | |
| 8,315,641 B2 * | 11/2012 | Chun | H04W 74/0833 455/452.1 |
| 8,369,269 B2 | 2/2013 | Nakashima | H04W 72/12 370/328 |
| 8,503,426 B2 | 8/2013 | Baldemair et al. | |
| 8,644,250 B2 | 2/2014 | Chun | H04W 56/00 370/331 |
| 2002/0102974 A1 | 8/2002 | Raith | |
| 2003/0001776 A1 | 1/2003 | Hannah et al. | |
| 2003/0076812 A1 | 4/2003 | Benedittis | H04W 74/002 370/350 |
| 2003/0128681 A1 | 7/2003 | Rauschmayer | |
| 2003/0156827 A1 | 8/2003 | Janevski | |
| 2004/0057395 A1 * | 3/2004 | Sakuma | H04W 24/00 370/318 |
| 2005/0025192 A1 | 2/2005 | Jang | |
| 2005/0068919 A1 | 3/2005 | Pedlar et al. | |
| 2005/0130692 A1 | 6/2005 | Furukawa et al. | |
| 2005/0176437 A1 | 8/2005 | Mir | H04W 56/00 455/450 |
| 2005/0180362 A1 | 8/2005 | Chin et al. | 370/335 |
| 2005/0255870 A1 | 11/2005 | Chang et al. | |
| 2006/0019687 A1 | 1/2006 | Gang et al. | |
| 2006/0058051 A1 | 3/2006 | Takano et al. | |
| 2006/0166688 A1 | 7/2006 | Sun et al. | |
| 2006/0258383 A1 * | 11/2006 | Jiang | H04W 52/383 455/502 |
| 2007/0254656 A1 | 11/2007 | Dalsgaard | H04B 7/2681 455/435.1 |
| 2007/0293185 A1 | 12/2007 | Hwang | H04L 43/0823 455/403 |
| 2008/0002660 A1 | 1/2008 | Jeong | H04B 7/2681 370/350 |
| 2008/0016248 A1 | 1/2008 | Tsirtsis | H04W 56/002 709/248 |
| 2008/0232260 A1 | 9/2008 | Yeo | H04W 72/1252 370/242 |
| 2008/0310396 A1 | 12/2008 | Park | H04W 56/0045 370/350 |
| 2009/0092205 A1 | 4/2009 | Amano | |
| 2009/0141700 A1 | 6/2009 | Baldemair et al. | |
| 2009/0196208 A1 | 8/2009 | Yu | H04W 76/048 370/311 |
| 2010/0080155 A1 | 4/2010 | Suzuki | H04W 4/20 370/310 |
| 2010/0080156 A1 | 4/2010 | Nichols | H04W 4/20 370/310 |
| 2011/0013573 A1 | 1/2011 | Kim et al. | |
| 2011/0069800 A1 | 3/2011 | Ohta | H04W 56/0045 375/371 |
| 2011/0164587 A1 * | 7/2011 | Seo | H04W 76/18 370/329 |
| 2011/0176443 A1 | 7/2011 | Astely et al. | |
| 2013/0308615 A1 | 11/2013 | Baldemair et al. | |

FOREIGN PATENT DOCUMENTS

| | | | |
|---|---|---|---|
| EP | 1 124 347 | 8/2001 | |
| EP | 2 034 631 A1 | 11/2009 | |
| EP | 1 952 560 B1 | 11/2013 | |
| JP | P21430 (2004-242187) | 10/2011 | |
| RU | 2198473 C2 | 2/2003 | |
| RU | 2198474 C2 | 2/2003 | |
| SE | 502 349 C2 | 10/1995 | |
| SE | 0502349-4 | 10/2005 | |
| WO | 95/08097 | 3/1995 | |
| WO | 01/33753 A1 | 5/2001 | |
| WO | WO 0133753 A1 | 5/2001 | |
| WO | WO 01/63775 A2 | 8/2001 | |
| WO | 01/67620 A2 | 9/2001 | |
| WO | WO 2004/102833 | 11/2004 | |
| WO | WO-2004102833 A1 | 11/2004 | H04W 52/383 |
| WO | 2007 045505 A1 | 4/2007 | |
| WO | WO-2007040323 A1 | 4/2007 | H04W 72/1252 |
| WO | 2016/019088 A1 | 2/2010 | |

OTHER PUBLICATIONS

European Patent Register for European Patent No. EP1952560; European Patent Application 06 828 846.3 based on International Patent Application No. PCT/EP2006/010163; Document Concerning Representation, Power of Attorneys; 5 pages, Dec. 29, 2006.

European Patent Register for European Patent No. EP1952560; European Patent Application 06 828 846.3 based on International Patent Application No. PCT/EP2006/010163; International Publication of the A1 Pamphlet; 27 pages, Apr. 26, 2007.

European Patent Register for European Patent No. EP1952560; European Patent Application 06 828 846.3 based on International Patent Application No. PCT/EP2006/010163; International Search Report; 2 pages, dated Apr. 26, 2007.

(56) References Cited

OTHER PUBLICATIONS

European Patent Register for European Patent No. EP1952560; European Patent Application 06 828 846.3 based on International Patent Application No. PCT/EP2006/010163; Priority Document; 13 pages, May 18, 2007.
European Patent Register for European Patent No. EP1952560; European Patent Application 06 828 846.3 based on International Patent Application No. PCT/EP2006/010163; Reply to International Search Opinion; 4 pages, dated May 21, 2007.
European Patent Register for European Patent No. EP1952560; European Patent Application 06 828 846.3 based on International Patent Application No. PCT/EP2006/010163; PCT (IPEA) Amended Sheet—Claims (annotated copy); 4 pages, May 21, 2007.
European Patent Register for European Patent No. EP1952560; European Patent Application 06 828 846.3 based on International Patent Application No. PCT/EP2006/010163; PCT (IPEA) Amended Sheet—Claims (clean copy); 4 pages, May 21, 2007.
European Patent Register for European Patent No. EP1952560; European Patent Application 06 828 846.3 based on International Patent Application No. PCT/EP2006/010163; PCT Demand under Article 31 of the Patent Cooperation Treaty; Chapter II; 4 pages, May 21, 2007.
European Patent Register for European Patent No. EP1952560; European Patent Application 06 828 846.3 based on International Patent Application No. PCT/EP2006/010163; PCT Notification of Receipt of Demand by Competent International Preliminary Examining Authority; 1 page, Jun. 12, 2007.
European Patent Register for European Patent No. EP1952560; European Patent Application 06 828 846.3 based on International Patent Application No. PCT/EP2006/010163; PCT Notification Concerning Documents Transmitted to The International Bureau of WIPO; 1 page, Jun. 12, 2007.
European Patent Register for European Patent No. EP1952560; European Patent Application 06 828 846.3 based on International Patent Application No. PCT/EP2006/010163; PCT Notification of Election (PCT Article 31(7) and Rule 61.2); 1 page, Jul. 11, 2007.
European Patent Register for European Patent No. EP1952560; European Patent Application 06 828 846.3 based on International Patent Application No. PCT/EP2006/010163; PCT Notification of Transmittal of the International Preliminary Report on Patentability (PCT Rule 71.1), 1 page, dated Jan. 22, 2008.
European Patent Register for European Patent No. EP1952560; European Patent Application 06 828 846.3 based on International Patent Application No. PCT/EP2006/010163; PCT Notification Concerning Documents Transmitted to The International Bureau of WIPO; 1 page, Jan. 22, 2008.
European Patent Register for European Patent No. EP1952560; European Patent Application 06 828 846.3 based on International Patent Application No. PCT/EP2006/010163; International Preliminary Report on Patentability; 2 pages, dated Jan. 1, 2008.
European Patent Register for European Patent No. EP1952560; European Patent Application 06 828 846.3 based on International Patent Application No. PCT/EP2006/010163; International Preliminary Report on Patentability; 2 pages, dated Jan. 22, 2008.
European Patent Register for European Patent No. EP1952560; European Patent Application 06 828 846.3 based on International Patent Application No. PCT/EP2006/010163; International Preliminary Report on Patentability; (Separate Sheet); 3 pages, dated Jan. 22, 2008.
European Patent Register for European Patent No. EP1952560; European Patent Application 06 828 846.3 based on International Patent Application No. PCT/EP2006/010163; PCT International Preliminary Report on Patentability (Chapter II of the Patent Cooperation Treaty); (PCT Article 36 and Rule 70); 1 page, dated Jan. 22, 2008.
European Patent Register for European Patent No. EP1952560; European Patent Application 06 828 846.3 based on International Patent Application No. PCT/EP2006/010163; Annex to the International Preliminary Examination Report; Amended Claims; 4 pages, Jan. 22, 2008.
European Patent Register for European Patent No. EP1952560; European Patent Application 06 828 846.3 based on International Patent Application No. PCT/EP2006/010163; Entry into the European Phase Before the European Patent Office Information; 3 pages, Feb. 29, 2008.
European Patent Register for European Patent No. EP1952560; European Patent Application 06 828 846.3 based on International Patent Application No. PCT/EP2006/010163; the PCT International Preliminary Report on Patentability; (Chapter II of the Patent Cooperation Treaty); (PCT Artkcle 36 and 70); 6 pages, Apr. 28, 2008.
European Patent Register for European Patent No. EP1952560; European Patent Application 06 828 846.3 based on International Patent Application No. PCT/EP2006/010163; Annexes to the International Preliminary Report; Amended Claims; 4 pages, Apr. 28, 2008.
European Patent Register for European Patent No. EP1952560; European Patent Application 06 828 846.3 based on International Patent Application No. PCT/EP2006/010163; Request for Enry into the European Phase (EPO as Designated or Elected Office; 7 pages, May 20, 2008.
European Patent Register for European Patent No. EP1952560; International Patent Application No. PCT/EP2006/010163; European Patent Application 06 828 846.3 based on Matter Concerning the Application; Correcting the Address of the Applicant and Amendments to the Application Documents; 4 pages, May 20, 2008.
European Patent Register for European Patent No. EP1952560; European Patent Application 06 828 846.3 based on International Patent Application No. PCT/EP2006/010163; Amended Claims 1 to 20 for the European Examination Procedure (annotated copy); 4 pages, May 20, 2008.
European Patent Register for European Patent No. EP1952560; European Patent Application 06 828 846.3 based on International Patent Application No. PCT/EP2006/010163; Amended Claims 1 to 20 for the European Examination Procedure (clean copy); 4 pages, May 20, 2008.
European Patent Register for European Patent No. EP1952560; European Patent Application 06 828 846.3 based on International Patent Application No. PCT/EP2006/010163; Partial Description Filed in Response to Formal Objections, 5 pages, May 20, 2008.
European Patent Register for European Patent No. EP1952560; European Patent Application 06 828 846.3 based on International Patent Application No. PCT/EP2006/010163; Communication Pursuant to Rules 161 and 162 EPC; 2 pages, dated Jun. 27, 2008.
European Patent Register for European Patent No. EP1952560; European Patent Application 06 828 846.3 based on International Patent Application No. PCT/EP2006/010163; Refund of Fees; 1 page, Jul. 7, 2008.
European Patent Register for European Patent No. EP1952560; European Patent Application 06 828 846.3 based on International Patent Application No. PCT/EP2006/010163; Communication of European Publication Number and Information on the Application of Article 67(3) EPC; 1 page, Jul. 9, 2008.
European Patent Register for European Patent No. EP1952560; European Patent Application 06 828 846.3 based on International Patent Application No. PCT/EP2006/010163; Notification of the Data Mentioned in Rule 19(3) EPC; 2 pages, Jul. 15, 2008.
European Patent Register for European Patent No. EP1952560; European Patent Application 06 828 846.3 based on International Patent Application No. PCT/EP2006/010163; Communication Pursuant to Rule 19(1) EPC; Invitation to Indicate Correct Address of Inventor, 1 page, Jul. 22, 2008.
European Patent Register for European Patent No. EP1952560; European Patent Application 06 828 846.3 based on International Patent Application No. PCT/EP2006/010163; Response to Official Notification Pursuant to Rule 19(1) EPC; 1 page, Aug. 4, 2008.
European Patent Register for European Patent No. EP1952560; European Patent Application 06 828 846.3 based on International Patent Application No. PCT/EP2006/010163; Notice Drawing Attention to Rule 51(2) EPC, Article 2 No. 5 of the Rules Relating to Fees; Payment of the Renewal Fee Plus Additional Fee; 1 page, Dec. 5, 2008.

(56) References Cited

OTHER PUBLICATIONS

European Patent Register for European Patent No. EP1952560; European Patent Application 06 828 846.3 based on International Patent Application No. PCT/EP2006/010163; Description; Amended pp. 4-7; 4 pages, Feb. 9, 2009.
European Patent Register for European Patent No. EP1952560; European Patent Application 06 828 846.3 based on International Patent Application No. PCT/EP2006/010163; Amended Claims 1-20 (annotated copy); 4 pages, Feb. 9, 2009.
European Patent Register for European Patent No. EP1952560; European Patent Application 06 828 846.3 based on International Patent Application No. PCT/EP2006/010163; Amended Claims 1-18 (clean copy), 4 pages, Feb. 9, 2009.
European Patent Register for European Patent No. EP1952560; European Patent Application 06 828 846.3 based on International Patent Application No. PCT/EP2006/010163; Amendments Received Before Examination; 3 pages, Feb. 9, 2009.
European Patent Register for European Patent No. EP1952560; European Patent Application 06 828 846.3 based on International Patent Application No. PCT/EP2006/010163; Consultation by Telephone With the Applicant/Representative; 1 page, Dec. 12, 2012.
European Patent Register for European Patent No. EP1952560; European Patent Application 06 828 846.3 based on International Patent Application No. PCT/EP2006/010163; Result of Consultation by Telephone/In Person; 1 page, Dec. 12, 2012.
European Patent Register for European Patent No. EP1952560; European Patent Application 06 828 846.3 based on International Patent Application No. PCT/EP2006/010163; Annex to the Communication Regarding Telephone Consultation; 1 page, Dec. 12, 2012.
European Patent Register for European Patent No. EP1952560; European Patent Application 06 828 846.3 based on International Patent Application No. PCT/EP2006/010163; Communication Pursuant to Article 94(3) EPC; Communication from the Examining Division; 2 pages, Jan. 2, 2013.
European Patent Register for European Patent No. EP1952560; European Patent Application 06 828 846.3 based on International Patent Application No. PCT/EP2006/010163; Annex to the Communication from the Examining Division; 2 pages, Jan. 2, 2013.
European Patent Register for European Patent No. EP1952560; European Patent Application 06 828 846.3 based on International Patent Application No. PCT/EP2006/010163; Reply to the Communication from the Examining Division; 6 pages, Mar. 27, 2013.
European Patent Register for European Patent No. EP1952560; European Patent Application 06 828 846.3 based on International Patent Application No. PCT/EP2006/010163; Description; 6 pages, Mar. 27, 2013.
European Patent Register for European Patent No. EP1952560; European Patent Application 06 828 846.3 based on International Patent Application No. PCT/EP2006/010163; Auxiliary Request; Amended Claims (clean copy); 2 pages, Mar. 27, 2013.
European Patent Register for European Patent No. EP1952560; European Patent Application 06 828 846.3 based on International Patent Application No. PCT/EP2006/010163; Main Request, Amended Claims (clean copy); 2 pages, Mar. 27, 2013.
European Patent Register for European Patent No. EP1952560; European Patent Application 06 828 846.3 based on International Patent Application No. PCT/EP2006/010163; Amended Description (annotated copy); 6 pages, Mar. 27, 2013.
European Patent Register for European Patent No. EP1952560; European Patent Application 06 828 846.3 based on International Patent Application No. PCT/EP2006/010163; Main Request; Amended Claims (annotated copy); 2 pages, Mar. 27, 2013.
European Patent Register for European Patent No. EP1952560; European Patent Application 06 828 846.3 based on International Patent Application No. PCT/EP2006/010163; Auxiliary Request; Amended Claims (annotated copy); 2 pages, Mar. 27, 2013.
European Patent Register for European Patent No. EP1952560; European Patent Application 06 828 846.3 based on International Patent Application No. PCT/EP2006/010163; A1 Pamphlet; Text Intended for Grant; 26 pages, Jun. 20, 2013.
European Patent Register for European Patent No. EP1952560; European Patent Application 06 828 846.3 based on International Patent Application No. PCT/EP2006/010163; Intention to Grant Signatures; 1 page, Jun. 20, 2013.
European Patent Register for European Patent No. EP1952560; European Patent Application 06 828 846.3 based on International Patent Application No. PCT/EP2006/010163; Communication Under Rule 71(3) EPC; Intention to Grant European Patent; 5 pages, Jun. 20, 2013.
European Patent Register for European Patent No. EP1952560; European Patent Application 06 828 846.3 based on International Patent Application No. PCT/EP2006/010163; Annex to EPO Form 2004, Communication Pursuant to Rule 71(3) EPC; Bibliographical Data of European Patent Application; 2 pages, Jun. 20, 2013.
European Patent Register for European Patent No. EP1952560; European Patent Application 06 828 846.3 based on International Patent Application No. PCT/EP2006/010163; Annex to the Communication About Intention to Grant a European Patent; 1 page, Jun. 20, 2013.
European Patent Register for European Patent No. EP1952560; European Patent Application 06 828 846.3 based on International Patent Application No. PCT/EP2006/010163; Request for Change of Applicant's Representative; 1 page, Jul. 9, 2013.
European Patent Register for European Patent No. EP1952560; European Patent Application 06 828 846.3 based on International Patent Application No. PCT/EP2006/010163; Letter Accompanying Subsequently Filed Items; Request for Change of Representative; 1 page, Jul. 9, 2013.
European Patent Register for European Patent No. EP1952560; European Patent Application 06 828 846.3 based on International Patent Application No. PCT/EP2006/010163; Acknowledgement of Receipt; Change of Representative; 1 page, Jul. 9, 2013.
European Patent Register for European Patent No. EP1952560; European Patent Application 06 828 846.3 based on International Patent Application No. PCT/EP2006/010163; Communication of Amended Entries Concerning the Representative (R. 143(1)(h) EPC); 1 page, Aug. 30, 2013.
European Patent Register for European Patent No. EP1952560; European Patent Application 06 828 846.3 based on International Patent Application No. PCT/EP2006/010163; Communication Pursuant to Article 1(2) of the Decision of the President of the EPO dated Jul. 12, 2007 Concerning the Filing of Authorisations (Special Edition No. 3, OJ EPO 2007, L.I.), 1 page, Aug. 30, 2013.
European Patent Register for European Patent No. EP1952560; European Patent Application 06 828 846.3 based on International Patent Application No. PCT/EP2006/010163; Letter Accompanying Subsequently Filed Items; 2 pages, Sep. 27, 2013.
European Patent Register for European Patent No. EP1952560; European Patent Application 06 828 846.3 based on International Patent Application No. PCT/EP2006/010163; German Translation of the Claims, 3 pages, Sep. 27, 2013.
European Patent Register for European Patent No. EP1952560; European Patent Application 06 828 846.3 based on International Patent Application No. PCT/EP2006/010163; French Translations of the Claims; 3 pages, Sep. 27, 2013.
European Patent Register for European Patent No. EP1952560; European Patent Application 06 828 846.3 based on International Patent Application No. PCT/EP2006/010163; Response to Communication Pursuant to Rule 71(3) EPC; Filing of the Translations of the Claims; 1 page, Sep. 27, 2013.
European Patent Register for European Patent No. EP1952560; European Patent Application 06 828 846.3 based on International Patent Application No. PCT/EP2006/010163; Acknowledgement of Receipt of Submitted Documents; 1 page, Sep. 27, 2013.
European Patent Register for European Patent No. EP1952560; European Patent Application 06 828 846.3 based on International Patent Application No. PCT/EP2006/010163; Decision to Grant a European Patent Pursuant to Article 97(1) EPC; 2 pages.
European Patent Register for European Patent No. EP1952560; European Patent Application 06 828 846.3 based on International

(56) References Cited

OTHER PUBLICATIONS

Patent Application No. PCT/EP2006/010163; Transmission of the Certificate for a European Patent Pursuant to rule 74 EPC; 1 page, Dec. 11, 2013.
European Patent Register for European Patent No. EP1952560; European Patent Application 06 828 846.3 based on International Patent Application No. PCT/EP2006/010163; Notice of Opposition; Opponent; Huawei Technologies Co., Ltd., 26 pages, Jul. 21, 2014.
European Patent Register for European Patent No. EP1952560; European Patent Application 06 828 846.3 based on International Patent Application No. PCT/EP2006/010163; Notice of Opposition to a European Patent; 5 pages, Jul. 21, 2014.
European Patent Register for European Patent No. EP1952560; European Patent Application 06 828 846.3 based on International Patent Application No. PCT/EP2006/010163; TSG-RAN Working Group 1 (Radio) Meeting #5; TSGR1#5(99)624; Source: CWTS WG1, Title: Method and Principle of Uplink Synchronization; Cheju, South Korea; 6 pages, Jul. 21, 2014.
European Patent Register for European Patent No. EP1952560; European Patent Application 06 828 846.3 based on International Patent Application No. PCT/EP2006/010163; Acknowledgement of Receipt for Submitted Documents; 2 pages, Jul. 21, 2014.
European Patent Register for European Patent No. EP1952560; European Patent Application 06 828 846.3 based on International Patent Application No. PCT/EP2006/010163; Communication of a Notice of Opposition, 1 page, Jul. 25, 2014.
European Patent Register for European Patent No. EP1952560; European Patent Application 06 828 846.3 based on International Patent Application No. PCT/EP2006/010163; Communication of Further Notices of Opposition Pursuant to Rule 79(2) EPC, 1 page, Oct. 16, 2014.
European Patent Register for European Patent No. EP1952560; European Patent Application 06 828 846.3 based on International Patent Application No. PCT/EP2006/010163; Communication of Notices of Opposition (R. 79(1) EPC); 1 page, Oct. 16, 2014.
European Patent Register for European Patent No. EP1952560; European Patent Application 06 828 846.3 based on International Patent Application No. PCT/EP2006/010163; Request for Extension of Time Limit; 1 page, Feb. 2, 2015.
European Patent Register for European Patent No. EP1952560; European Patent Application 06 828 846.3 based on International Patent Application No. PCT/EP2006/010163; Grant of Extension of Time Limit Pursuant to Rule 132 EPC; 1 page, Mar. 12, 2015.
European Patent Register for European Patent No. EP1952560; European Patent Application 06 828 846.3 based on International Patent Application No. PCT/EP2006/010163; Communication of Amended Entries Concerning the Representative (R. 143(1)(h) EPC); 1 page, Mar. 12, 2015.
European Patent Register for European Patent No. EP1952560; European Patent Application 06 828 846.3 based on International Patent Application No. PCT/EP2006/010163; Brief Communication; Opposition Proceedings; 1 page, Mar. 12, 2015.
European Patent Register for European Patent No. EP1952560; European Patent Application 06 828 846.3 based on International Patent Application No. PCT/EP2006/010163; Document Concerning Representation; 1 page, Mar. 26, 2015.
European Patent Register for European Patent No. EP1952560; European Patent Application 06 828 846.3 based on International Patent Application No. PCT/EP2006/010163; client Database System (CDS) Clean Up: Amended Data Concerning the Representative for the Applicant; 1 page, Mar. 30, 2015.
European Patent Register for European Patent No. EP1952560; European Patent Application 06 828 846.3 based on International Patent Application No. PCT/EP2006/010163; Request for the Acceleration of the Opposition Proceedings; 1 page, Apr. 27, 2015.
European Patent Register for European Patent No. EP1952560; European Patent Application 06 828 846.3 based on International Patent Application No. PCT/EP2006/010163; Reply of the Patent Proprietor to the Notice(s) of Opposition; 10 pages, Apr. 27, 2015.
European Patent Register for European Patent No. EP1952560; European Patent Application 06 828 846.3 based on International Patent Application No. PCT/EP2006/010163; Brief Communication—Opposition Proceedings; 1 page, May 6, 2015.
European Patent Register for European Patent No. EP1952560; European Patent Application 06 828 846.3 based on International Patent Application No. PCT/EP2006/010163; Summons to Attend Oral Proceedings Pursuant to Rule 115(1) EPC; 1 page, Jul. 6, 2015.
European Patent Register for European Patent No. EP1952560; European Patent Application 06 828 846.3 based on International Patent Application No. PCT/EP2006/010163; Preparation for Oral Proceedings—Instructions to Support Service; 2 pages, Jul. 6, 2015.
European Patent Register for European Patent No. EP1952560; European Patent Application 06 828 846.3 based on International Patent Application No. PCT/EP2006/010163; Information Concerning Oral Proceedings; 3 pages, Jul. 6, 2015.
European Patent Register for European Patent No. EP1952560; European Patent Application 06 828 846.3 based on International Patent Application No. PCT/EP2006/010163; Annex to the Communication—Opposition; 7 pages, Jul. 6, 2015.
European Patent Register for European Patent No. EP1952560; European Patent Application 06 828 846.3 based on International Patent Application No. PCT/EP2006/010163; Acknowledgement of a Document; 1 page, Jul. 6, 2015.
European Patent Register for European Patent No. EP1952560; European Patent Application 06 828 846.3 based on International Patent Application No. PCT/EP2006/010163; Advice of Delivery; Tracking Information; 1 page, Jul. 7, 2015.
European Patent Register for European Patent No. EP1952560; European Patent Application 06 828 846.3 based on International Patent Application No. PCT/EP2006/010163; Advice of Delivery; 2 pages, Jul. 8, 2015.
European Patent Register for European Patent No. EP1952560; European Patent Application 06 828 846.3 based on International Patent Application No. PCT/EP2006/010163; Advice of Delivery; 1 page, Jul. 8, 2015.
European Patent Register for European Patent No. EP1952560; European Patent Application 06 828 846.3 based on International Patent Application No. PCT/EP2006/010163; Request for Interpreters during Oral Proceedings; 1 page, Jul. 10, 2015.
European Patent Register for European Patent No. EP1952560; European Patent Application 06 828 846.3 based on International Patent Application No. PCT/EP2006/010163; Payment of Fees and Expenses; 1 page, Jul. 10, 2015.
European Patent Register for European Patent No. EP1952560; European Patent Application 06 828 846.3 based on International Patent Application No. PCT/EP2006/010163; Intervention of the Assumed Infringer According to Art. 105 EPC; 8 pages, Jul. 10, 2015.
European Patent Register for European Patent No. EP1952560; European Patent Application 06 828 846.3 based on International Patent Application No. PCT/EP2006/010163; Notice of Opposition to a European Patent; 4 pages, Jul. 10, 2015.
European Patent Register for European Patent No. EP1952560; European Patent Application 06 828 846.3 based on International Patent Application No. PCT/EP2006/010163; Preu Bohlig & Partner, Klage, Non-Patent Literature Cited During the Opposition Procedure; 19 pages, Jul. 10, 2015.
European Patent Register for European Patent No. EP1952560; European Patent Application 06 828 846.3 based on International Patent Application No. PCT/EP2006/010163; Landgericht Mannheim; Non-Patent Literature Cited During the Opposition Procedure; 4 pages, Jul. 10, 2015.
European Patent Register for European Patent No. EP1952560; European Patent Application 06 828 846.3 based on International Patent Application No. PCT/EP2006/010163; Landgericht Mannheim; Non-Patent Literature Cited During the Opposition Procedure; 2 pages, Jul. 10, 2015.
European Patent Register for European Patent No. EP1952560; European Patent Application 06 828 846.3 based on International Patent Application No. PCT/EP2006/010163; Opposition Against EP 1 952 560 B; Schedule for Opposition/Nulhty Cases of Mr. Martin Körber in Feb., Mar. and Apr. 2016; 1 page, Oct. 7, 2015.

(56) References Cited

OTHER PUBLICATIONS

European Patent Register for European Patent No. EP1952560; European Patent Application 06 828 846.3 based on International Patent Application No. PCT/EP2006/010163; Letter Regarding the Opposition Procedure; 2 pages, Jul. 10, 2015.
European Patent Register for European Patent No. EP1952560; European Patent Application 06 828 846.3 based on International Patent Application No. PCT/EP2006/010163; Advice of Delivery; 1 page, Jul. 10, 2015.
European Patent Register for European Patent No. EP1952560; European Patent Application 06 828 846.3 based on International Patent Application No. PCT/EP2006/010163; Payment of Fees and Expenses; 1 page, Jul. 15, 2015.
European Patent Register for European Patent No. EP1952560; European Patent Application 06 828 846.3 based on International Patent Application No. PCT/EP2006/010163; Landgericht Mannheim; Non-Patent Literature Cited During the Opposition Procedure; 4 pages, Jul. 15, 2015.
European Patent Register for European Patent No. EP1952560; European Patent Application 06 828 846.3 based on International Patent Application No. PCT/EP2006/010163; Landgericht Mannheim; Non-Patent Literature Cited During the Opposition Procedure; 2 pages, Jul. 15, 2015.
European Patent Register for European Patent No. EP1952560; European Patent Application 06 828 846.3 based on International Patent Application No. PCT/EP2006/010163; Preu Bohlig & Partner, Klage, Non-Patent Literature Cited During the Opposition Procedure; 19 pages, Jul. 15, 2015.
European Patent Register for European Patent No. EP1952560; European Patent Application 06 828 846.3 based on International Patent Application No. PCT/EP2006/010163; Notice of Opposition to a European Patent; 4 pages, Jul. 15, 2015.
European Patent Register for European Patent No. EP1952560; European Patent Application 06 828 846.3 based on International Patent Application No. PCT/EP2006/010163; Intervention of the Assumed Infringer According to Art. 105 EPC; 8 pages, Jul. 15, 2015.
European Patent Register for European Patent No. EP1952560; European Patent Application 06 828 846.3 based on International Patent Application No. PCT/EP2006/010163; Zestellungsurkunde, Non-Patent Literature Cited During the Opposition Procedure, 2 pages, Jul. 17, 2015.
European Patent Register for European Patent No. EP1952560; European Patent Application 06 828 846.3 based on International Patent Application No. PCT/EP2006/010163; Letter Regarding the Opposition Procedure; 1 page, Jul. 17, 2015.
European Patent Register for European Patent No. EP1952560; European Patent Application 06 828 846.3 based on International Patent Application No. PCT/EP2006/010163; Zustellungsurkunde, Non-Patent Literature Cited During the Opposition Procedure, 2 pages, Jul. 20, 2015.
European Patent Register for European Patent No. EP1952560; European Patent Application 06 828 846.3 based on International Patent Application No. PCT/EP2006/010163; Letter Regarding the Opposition Procedure: Intervener: Apple Retail Germany GmbH; 1 page, Jul. 20, 2015.
European Patent Register for European Patent No. EP1952560; European Patent Application 06 828 846.3 based on International Patent Application No. PCT/EP2006/010163; Maintenance/Change of Date/Cancellation of Oral Proceedings Arranged For: Date Sep. 3, 2016 at 9.00 hours; 2 pages, Jul. 20, 2015.
European Patent Register for European Patent No. EP1952560; European Patent Application 06 828 846.3 based on International Patent Application No. PCT/EP2006/010163; Letter Regarding the Opposition Procedure; 2 pages, Jul. 22, 2015
European Patent Register for European Patent No. EP1952560; European Patent Application 06 828 846.3 based on International Patent Application No. PCT/EP2006/010163; Brief Communication—Notification Concerning the Date of Oral Proceedings; 1 page, Jul. 23, 2015.
European Patent Register for European Patent No. EP1952560; European Patent Application 06 828 846.3 based on International Patent Application No. PCT/EP2006/010163; Communication of Notices of Intervention (Art. 105 and R.89 EPC); 1 page, Jul. 23, 2015.
European Patent Register for European Patent No. EP1952560; European Patent Application 06 828 846.3 based on International Patent Application No. PCT/EP2006/010163; Communication Indicating Deficiencies in the Notice of Opposition Which May Be Remedied; 2 pages, Jul. 23, 2015.
European Patent Register for European Patent No. EP1952560; European Patent Application 06 828 846.3 based on International Patent Application No. PCT/EP2006/010163; Brief Communication—Opposition Proceedings; 1 page, Jul. 23, 2015.
European Patent Register for European Patent No. EP1952560; European Patent Application 06 828 846.3 based on International Patent Application No. PCT/EP2006/010163; Acknowledgement, Patent Document Cited During the Opposition Procedure; 1 page, Jul. 25, 2015.
European Patent Register for European Patent No. EP1952560; European Patent Application 06 828 846.3 based on International Patent Application No. PCT/EP2006/010163; Letter Regarding the Opposition Procedure; 1 page, Jul. 25, 2015.
European Patent Register for European Patent No. EP1952560; European Patent Application 06 828 846.3 based on International Patent Application No. PCT/EP2006/010163; Authorisation of Representative, 2 pages, Jul. 25, 2015.
European Patent Register for European Patent No. EP1952560; European Patent Application 06 828 846.3 based on International Patent Application No. PCT/EP2006/010163; Brief Communication—Opposition Proceedings; 1 page, Jul. 27, 2015.
European Patent Register for European Patent No. EP1952560; European Patent Application 06 828 846.3 based on International Patent Application No. PCT/EP2006/010163; Brief Communication—Opposition Proceedings; 1 page, Jul. 28, 2015.
European Patent Register for European Patent No. EP1952560; European Patent Application 06 828 846.3 based on International Patent Application No. PCT/EP2006/010163; Letter Regarding the Opposition Procedure; 2 pages, Aug. 1, 2015.
European Patent Register for European Patent No. EP1952560; European Patent Application 06 828 846.3 based on International Patent Application No. PCT/EP2006/010163; Brief Communication—Opposition Proceedings; 1 page, Aug. 7, 2015.
European Patent Register for European Patent No. EP1952560; European Patent Application 06 828 846.3 based on International Patent Application No. PCT/EP2006/010163; Summons to Attend Oral Proceedings Pursuant to Rule 115(1) EPC; 1 page, Aug. 10, 2015.
European Patent Register for European Patent No. EP1952560; European Patent Application 06 828 846.3 based on International Patent Application No. PCT/EP2006/010163; Information Concerning Oral Proceedings, 3 pages, Aug. 10, 2015.
European Patent Register for European Patent No. EP1952560; European Patent Application 06 828 846.3 based on International Patent Application No. PCT/EP2006/010163; Acknowledgement of a Document; 1 page, Aug. 10, 2015.
European Patent Register for European Patent No. EP1952560; European Patent Application 06 828 846.3 based on International Patent Application No. PCT/EP2006/010163; Further Facts, Evidence and Arguments for Intervention of Jul. 10, 2015; 63 pages, Aug. 11, 2015.
European Patent Register for European Patent No. EP1952560; European Patent Application 06 828 846.3 based on International Patent Application No. PCT/EP2006/010163; Technique for Performing a Random Access Procedure Over a Radio Interface; Non-Patent Literature Cited During the Opposition Procedure; 26 pages, Aug. 11, 2015.
European Patent Register for European Patent No. EP1952560; European Patent Application 06 828 846.3 based on International Patent Application No. PCT/EP2006/010163; ETSI TS 136 331 V8.21.0; Technical Specification; LTE; Evolved Universal Terres-

(56) References Cited

OTHER PUBLICATIONS trial Radio Access (E-UTRA); Radio Resource Control (RRC); Protocol Specification; (3GPP TS 36.331 version 8.21.0 Release 8); 3 pages, Aug. 11, 2015.
European Patent Register for European Patent No. EP1952560; European Patent Application 06 828 846.3 based on International Patent Application No. PCT/EP2006/010163; Preu Bohlig & Partner; Klage, Non-Patent Literature Cited During the Opposition Procedure; 3 pages, Aug. 11, 2015.
European Patent Register for European Patent No. EP1952560; European Patent Application 06 828 846.3 based on International Patent Application No. PCT/EP2006/010163; Further Facts, Evidence and Arguments for Intervention of Jul. 10, 2015; Letter Regarding the Opposition Procedure; 64 pages, Aug. 11, 2015.
European Patent Register for European Patent No. EP1952560; European Patent Application 06 828 846.3 based on International Patent Application No. PCT/EP2006/010163; Supplementary Submission, Letter Regarding the Opposition Procedure; 1 page, Aug. 11, 2015.
European Patent Register for European Patent No. EP1952560; European Patent Application 06 828 846.3 based on International Patent Application No. PCT/EP2006/010163; Further Facts, Evidence and Arguments for Intervention of Jul. 10, 2015; Letter Regarding the Opposition Procedure; 1 page, Aug. 11, 2015.
European Patent Register for European Patent No. EP1952560; European Patent Application 06 828 846.3 based on International Patent Application No. PCT/EP2006/010163; Advice of Delivery; 1 page, Aug. 11, 2015.
European Patent Register for European Patent No. EP1952560; European Patent Application 06 828 846.3 based on International Patent Application No. PCT/EP2006/010163; Advice of Delivery; 2 pages, Aug. 13, 2015.
European Patent Register for European Patent No. EP1952560; European Patent Application 06 828 846.3 based on International Patent Application No. PCT/EP2006/010163; Advice of Delivery; 1 page, Aug. 14, 2015.
European Patent Register for European Patent No. EP1952560; European Patent Application 06 828 846.3 based on International Patent Application No. PCT/EP2006/010163; Request for Interpreters During Oral Proceedings; 1 page, Aug. 17, 2015.
European Patent Register for European Patent No. EP1952560; European Patent Application 06 828 846.3 based on International Patent Application No. PCT/EP2006/010163; Advice of Delivery; 1 page, Aug. 17, 2015.
European Patent Register for European Patent No. EP1952560; European Patent Application 06 828 846.3 based on International Patent Application No. PCT/EP2006/010163; Klage; Non-Patent Literature Cited During the Opposition Period; 3 pages, Aug. 18, 2015.
European Patent Register for European Patent No. EP1952560; European Patent Application 06 828 846.3 based on International Patent Application No. PCT/EP2006/010163; Technique for Performing a Random Access Procedure Over a Radio Interface; Non-Patent Literature Cited During the Opposition Procedure; 26 pages, Aug. 18, 2015.
European Patent Register for European Patent No. EP1952560; European Patent Application 06 828 846.3 based on International Patent Application No. PCT/EP2006/010163; ETSI TS 136 331 V8.21.0; Technical Specification; LTE; Evolved Universal Terrestrial Radio Access (E-UTRA); Radio Resource Control (RRC); Protocol Specification; (3GPP TS 36.331 version 8.21.0 Release 8); 3 pages, Aug. 18, 2015.
European Patent Register for European Patent No. EP1952560; European Patent Application 06 828 846.3 based on International Patent Application No. PCT/EP2006/010163; Further Facts, Evidence and Arguments for Intervention of Jul. 10, 2015; 63 pages, Aug. 18, 2015.
European Patent Register for European Patent No. EP1952560; European Patent Application 06 828 846.3 based on International Patent Application No. PCT/EP2006/010163; Letter Accompanying Subsequently Filed Items; 1 page, Aug. 18, 2015.
European Patent Register for European Patent No. EP1952560; European Patent Application 06 828 846.3 based on International Patent Application No. PCT/EP2006/010163; Payment of Fees and Expenses; 1 page, Aug. 19, 2015.
European Patent Register for European Patent No. EP1952560; European Patent Application 06 828 846.3 based on International Patent Application No. PCT/EP2006/010163; Notice of Opposition to a European Patent; 4 pages, Aug. 19, 2015.
European Patent Register for European Patent No. EP1952560; European Patent Application 06 828 846.3 based on International Patent Application No. PCT/EP2006/010163; Writ of Summons in Accordance with the Accelerated Regime in Patent Cases; Non-Patent Literature Cited During the Opposition Procedure; 27 pages, Aug. 19, 2015.
European Patent Register for European Patent No. EP1952560; European Patent Application 06 828 846.3 based on International Patent Application No. PCT/EP2006/010163; Dagvaarding Volgens Het Versneld Regime Octrooizaken; Non-Patent Literature Cited During the Opposition Period; 29 pages, Aug. 19, 2015.
European Patent Register for European Patent No. EP1952560; European Patent Application 06 828 846.3 based on International Patent Application No. PCT/EP2006/010163; Intervention on Behalf of Apple Retail Netherlands B.V. in Opposition Proceedings re EP 1 952 560 B1; 22 pages, Aug. 19, 2015.
European Patent Register for European Patent No. EP1952560; European Patent Application 06 828 846.3 based on International Patent Application No. PCT/EP2006/010163; Intervention of the Alleged Infringer According to Art. 105 EPC; 1 page, Aug. 19, 2015.
European Patent Register for European Patent No. EP1952560; European Patent Application 06 828 846.3 based on International Patent Application No. PCT/EP2006/010163; Notice of Opposition to a European Patent; 4 pages, Aug. 22, 2015.
European Patent Register for European Patent No. EP1952560; European Patent Application 06 828 846.3 based on International Patent Application No. PCT/EP2006/010163; Dagvaarding Volgens Het Versneld Regime Octrooizaken; Non-Patent Literature Cited During the Opposition Period; 56 pages, Aug. 22, 2015.
European Patent Register for European Patent No. EP1952560; European Patent Application 06 828 846.3 based on International Patent Application No. PCT/EP2006/010163; Intervention on Behalf of Apple Retail Netherlands B.V. in Opposition Proceedings Re 1 952 560 B1; Non-Patent Literature Cited During the Opposition Period; 2 pages, Aug. 22, 2015.
European Patent Register for European Patent No. EP1952560; European Patent Application 06 828 846.3 based on International Patent Application No. PCT/EP2006/010163; Intervention of the Alleged Infringer According to Art. 105 EPC; 20 pages, Aug. 22, 2015.
European Patent Register for European Patent No. EP1952560; European Patent Application 06 828 846.3 based on International Patent Application No. PCT/EP2006/010163; Brief Communication—Opposition Proceedings; 1 page, Aug. 24, 2015.
European Patent Register for European Patent No. EP1952560; European Patent Application 06 828 846.3 based on International Patent Application No. PCT/EP2006/010163; Payment of Fees and Expenses; 1 page, Aug. 25, 2015.
European Patent Register for European Patent No. EP1952560; European Patent Application 06 828 846.3 based on International Patent Application No. PCT/EP2006/010163; Notice of Opposition to a European Patent; 4 pages, Aug. 25, 2015.
European Patent Register for European Patent No. EP1952560; European Patent Application 06 828 846.3 based on International Patent Application No. PCT/EP2006/010163; Intervention on Behalf of Apple Sales International in Opposition Proceedings re EP 1 952 560 B1; Non-Patent Literature Cited During the Opposition Procedure; 2 pages, Aug. 25, 2015.
European Patent Register for European Patent No. EP1952560; European Patent Application 06 828 846.3 based on International Patent Application No. PCT/EP2006/010163; Writ of Summons in

(56) References Cited

OTHER PUBLICATIONS

Accordance with the Accelerated Regime in Patent Cases; Non-Patent Literature Cited During the Opposition Procedure; 28 pages, Aug. 25, 2015.
European Patent Register for European Patent No. EP1952560; European Patent Application 06 828 846.3 based on International Patent Application No. PCT/EP2006/010163; Dagvaarding Volgens Het Versneld Regime Octrooizaken; Non-Patent Literature Cited During the Opposition Period; 30 pages, Aug. 25, 2015.
European Patent Register for European Patent No. EP1952560; European Patent Application 06 828 846.3 based on International Patent Application No. PCT/EP2006/010163; Service of Documents; Non-Patent Literature Cited During the Opposition Procedure; 1 page, Aug. 25, 2015.
European Patent Register for European Patent No. EP1952560; European Patent Application 06 828 846.3 based on International Patent Application No. PCT/EP2006/010163; Intervention of the Alleged Infringer According to Art. 105 EPC; 21 pages, Aug. 25, 2015.
European Patent Register for European Patent No. EP1952560; European Patent Application 06 828 846.3 based on International Patent Application No. PCT/EP2006/010163; Brief Communication—Opposition Proceedings; 1 page, Aug. 25, 2015.
European Patent Register for European Patent No. EP1952560; European Patent Application 06 828 846.3 based on International Patent Application No. PCT/EP2006/010163; Payment of Fees and Costs; 1 page, Aug. 28, 2015.
European Patent Register for European Patent No. EP1952560; European Patent Application 06 828 846.3 based on International Patent Application No. PCT/EP2006/010163; Notice of Opposition to a European Patent; 4 pages, Aug. 28, 2015.
European Patent Register for European Patent No. EP1952560; European Patent Application 06 828 846.3 based on International Patent Application No. PCT/EP2006/010163; Service of Documents; Non-Patent Literature Cited During the Opposition Procedure; 1 page, Aug. 28, 2015.
European Patent Register for European Patent No. EP1952560; European Patent Application 06 828 846.3 based on International Patent Application No. PCT/EP2006/010163; Intervention on Behalf of Apple Sales International in Opposition Proceedings re EP 1 952 560 B1; Non-Patent Literature Cited During the Opposition Procedure; 2 pages, Aug. 28, 2015.
European Patent Register for European Patent No. EP1952560; European Patent Application 06 828 846.3 based on International Patent Application No. PCT/EP2006/010163; Dagvaarding Volgens Het Versneld Regime Octrooizaken; Non-Patent Literature Cited During the Opposition Period; 58 pages, Aug. 28, 2015.
European Patent Register for European Patent No. EP1952560; European Patent Application 06 828 846.3 based on International Patent Application No. PCT/EP2006/010163; Intervention of the Alleged Infringer According to Art. 105 (EPC); 21 pages, Aug. 28, 2015.
European Patent Register for European Patent No. EP1952560; European Patent Application 06 828 846.3 based on International Patent Application No. PCT/EP2006/010163; Brief Communication—Opposition Proceedings; 1 page, Sep. 4, 2015.
European Patent Register for European Patent No. EP1952560; European Patent Application 06 828 846.3 based on International Patent Application No. PCT/EP2006/010163; Request for Interpreters During Oral Proceedings; 1 page, Sep. 7, 2015.
European Patent Register for European Patent No. EP1952560; European Patent Application 06 828 846.3 based on International Patent Application No. PCT/EP2006/010163; Communication of Notices of Intervention (Art. 105 and R. 89 EPC); 1 page, Sep. 8, 2015.
European Patent Register for European Patent No. EP1952560; European Patent Application 06 828 846.3 based on International Patent Application No. PCT/EP2006/010163; Communication Indicating Deficiencies in the Notice of Opposition Which May Be Remedies; 2 pages, Sep. 17, 2015.
European Patent Register for European Patent No. EP1952560; European Patent Application 06 828 846.3 based on International Patent Application No. PCT/EP2006/010163; Letter Regarding the Opposition Procedure; 2 pages, Sep. 28, 2015.
European Patent Register for European Patent No. EP1952560; European Patent Application 06 828 846.3 based on International Patent Application No. PCT/EP2006/010163; Letter Regarding the Opposition Procedure; 2 pages, Oct. 1, 2015.
European Patent Register for European Patent No. EP1952560; European Patent Application 06 828 846.3 based on International Patent Application No. PCT/EP2006/010163; Corrected/Completed Communication of Notices of Intervention (Art. 105 and R. 89 EPC); 1 page, Oct. 12, 2015.
European Patent Register for European Patent No. EP1952560; European Patent Application 06 828 846.3 based on International Patent Application No. PCT/EP2006/010163; Brief Communication—Opposition Proceedings; 1 page, Oct. 12, 2015.
European Patent Register for European Patent No. EP1952560; European Patent Application 06 828 846.3 based on International Patent Application No. PCT/EP2006/010163; Letter Regarding the Opposition Procedure; 1 page, Oct. 16, 2015.
European Patent Register for European Patent No. EP1952560; European Patent Application 06 828 846.3 based on International Patent Application No. PCT/EP2006/010163; Authorisation of Representative; 2 pages, Oct. 16, 2015.
European Patent Register for European Patent No. EP1952560; European Patent Application 06 828 846.3 based on International Patent Application No. PCT/EP2006/010163; Brief Communication—Opposition Proceedings; 1 page, Oct. 23, 2015.
European Patent Register for European Patent No. EP1952560; European Patent Application 06 828 846.3 based on International Patent Application No. PCT/EP2006/010163; Summons to Attend Oral Proceedings Pursuant to Rule 114(1) EPC; 1 page, Oct. 27, 2015.
European Patent Register for European Patent No. EP1952560; European Patent Application 06 828 846.3 based on International Patent Application No. PCT/EP2006/010163; Information concerning Oral Proceedings; 3 pages, Oct. 27, 2015.
European Patent Register for European Patent No. EP1952560; European Patent Application 06 828 846.3 based on International Patent Application No. PCT/EP2006/010163; Acknowledgement of a Document; 1 page, Oct. 27, 2015.
European Patent Register for European Patent No. EP1952560; European Patent Application 06 828 846.3 based on International Patent Application No. PCT/EP2006/010163; Advice of Delivery; 1 page, Oct. 28, 2015.
European Patent Register for European Patent No. EP1952560; European Patent Application 06 828 846.3 based on International Patent Application No. PCT/EP2006/010163; Advice of Delivery; 3 pages, Nov. 4, 2015.
European Patent Register for European Patent No. EP1952560; European Patent Application 06 828 846.3 based on International Patent Application No. PCT/EP2006/010163; Request for Interpreters During Oral Proceedings; 1 page, Nov. 27, 2015.
European Patent Register for European Patent No. EP1952560; European Patent Application 06 828 846.3 based on International Patent Application No. PCT/EP2006/010163; Request for Interpreters During Oral Proceedings; 1 page, Nov. 30, 2015.
European Patent Register for European Patent No. EP1952560; European Patent Application 06 828 846.3 based on International Patent Application No. PCT/EP2006/010163; Brief Communication—Opposition Proceedings; 1 page, Dec. 3, 2015.
European Patent Register for European Patent No. EP1952560; European Patent Application 06 828 846.3 based on International Patent Application No. PCT/EP2006/010163; Withdrawal of an Opposition; 1 page, Dec. 22, 2015.
European Patent Register for European Patent No. EP1952560; European Patent Application 06 828 846.3 based on International Patent Application No. PCT/EP2006/010163; Request for Correction of Name and Address of Applicant for Pending Applications; 5 pages, Dec. 22, 2015.
European Patent Register for European Patent No. EP1952560; European Patent Application 06 828 846.3 based on International

(56) References Cited

OTHER PUBLICATIONS

Patent Application No. PCT/EP2006/010163; Withdrawal of an Opposition; 1 page, Dec. 24, 2015.
European Patent Register for European Patent No. EP1952560; European Patent Application 06 828 846.3 based on International Patent Application No. PCT/EP2006/010163; Brief Communication—Opposition Proceedings; 1 page, Jan. 7, 2016.
European Patent Register for European Patent No. EP1952560; European Patent Application 06 828 846.3 based on International Patent Application No. PCT/EP2006/010163; Client Database System (CDS)—Clean Up; 1 page, Jan. 12, 2016.
European Patent Register for European Patent No. EP1952560; European Patent Application 06 828 846.3 based on International Patent Application No. PCT/EP2006/010163; Brief Communication—Opposition Proceedings; 1 page, Feb. 23, 2016.
European Patent Register for European Patent No. EP1952560; European Patent Application 06 828 846.3 based on International Patent Application No. PCT/EP2006/010163; Annex to the Communication—Opposition; 8 pages, Feb. 23, 2016.
European Patent Register for European Patent No. EP1952560; European Patent Application 06 828 846.3 based on International Patent Application No. PCT/EP2006/010163; Letter Regarding the Opposition Procedure; 12 pages, Mar. 24, 2016.
European Patent Register for European Patent No. EP1952560; European Patent Application 06 828 846.3 based on International Patent Application No. PCT/EP2006/010163; Letter Regarding the Opposition Procedure; 36 pages, Mar. 24, 2016.
European Patent Register for European Patent No. EP1952560; European Patent Application 06 828 846.3 based on International Patent Application No. PCT/EP2006/010163; Submission in Opposition Proceedings; 1 page, Mar. 24, 2016.
European Patent Register for European Patent No. EP1952560; European Patent Application 06 828 846.3 based on International Patent Application No. PCT/EP2006/010163; Claims; Auxiliary Request 1; (annotated and clean copy); 4 pages, Mar. 24, 2016.
European Patent Register for European Patent No. EP1952560; European Patent Application 06 828 846.3 based on International Patent Application No. PCT/EP2006/010163; Claims; Auxiliary Request 2; (annotated and clean copy); 4 pages, Mar. 24, 2016.
European Patent Register for European Patent No. EP1952560; European Patent Application 06 828 846.3 based on International Patent Application No. PCT/EP2006/010163; Claims; Auxiliary Request 3; (annotated and clean copy); 4 pages, Mar. 24, 2016.
European Patent Register for European Patent No. EP1952560; European Patent Application 06 828 846.3 based on International Patent Application No. PCT/EP2006/010163; Claims; Auxiliary Request 4; (annotated and clean copy); 5 pages, Mar. 24, 2016.
European Patent Register for European Patent No. EP1952560; European Patent Application 06 828 846.3 based on International Patent Application No. PCT/EP2006/010163; Claims; Auxiliary Request 5; (annotate and clean copy); 5 pages, Mar. 24, 2016.
European Patent Register for European Patent No. EP1952560; European Patent Application 06 828 846.3 based on International Patent Application No. PCT/EP2006/010163; Claims; Auxiliary Request 6; (annotate and clean copy); 5 pages, Mar. 24, 2016.
European Patent Register for European Patent No. EP1952560; European Patent Application 06 828 846.3 based on International Patent Application No. PCT/EP2006/010163; Claims; Auxiliary Request 7; (annotate and clean copy); 5 pages, Mar. 24, 2016.
European Patent Register for European Patent No. EP1952560; European Patent Application 06 828 846.3 based on International Patent Application No. PCT/EP2006/010163; Claims; Auxiliary Request 8; (annotate and clean copy); 6 pages, Mar. 24, 2016.
European Patent Register for European Patent No. EP1952560; European Patent Application 06 828 846.3 based on International Patent Application No. PCT/EP2006/010163; Claims; Auxiliary Request 9; (annotate and clean copy); 6 pages, Mar. 24, 2016.
European Patent Register for European Patent No. EP1952560; European Patent Application 06 828 846.3 based on International Patent Application No. PCT/EP2006/010163; Claims; Auxiliary Request 10; (annotate and clean copy); 5 pages, Mar. 24, 2016.
European Patent Register for European Patent No. EP1952560; European Patent Application 06 828 846.3 based on International Patent Application No. PCT/EP2006/010163; Claims; Auxiliary Request 11; (annotate and clean copy); 5 pages, Mar. 24, 2016.
European Patent Register for European Patent No. EP1952560; European Patent Application 06 828 846.3 based on International Patent Application No. PCT/EP2006/010163; Acknowledgement of Receipt; 1 page, Mar. 24, 2016.
European Patent Register for European Patent No. EP1952560; European Patent Application 06 828 846.3 based on International Patent Application No. PCT/EP2006/010163; Brief Communication—Opposition Proceedings; 1 page, Apr. 1, 2016.
European Patent Register for European Patent No. EP1952560; European Patent Application 06 828 846.3 based on International Patent Application No. PCT/EP2006/010163; Brief Communication—Opposition Proceedings; 1 page, Apr. 5, 2016.
European Patent Register for European Patent No. EP1952560; European Patent Application 06 828 846.3 based on International Patent Application No. PCT/EP2006/010163; Brief Communication—Opposition Proceedings; 1 page, Apr. 8, 2016.
European Patent Register for European Patent No. EP1952560; European Patent Application 06 828 846.3 based on International Patent Application No. PCT/EP2006/010163; Annex to the Communication; 1 page, Apr. 8, 2016.
European Patent Register for European Patent No. EP1952560; European Patent Application 06 828 846.3 based on International Patent Application No. PCT/EP2006/010163; Information About the Result of Oral Proceedings; 1 page, Apr. 26, 2016.
European Patent Register for European Patent No. EP1952560; European Patent Application 06 828 846.3 based on International Patent Application No. PCT/EP2006/010163; Annex to a Communication; 2 pages, Apr. 26, 2016.
European Patent Register for European Patent No. EP1952560; European Patent Application 06 828 846.3 based on International Patent Application No. PCT/EP2006/010163; Provision of the Minutes in Accordance with Rule 124(4) EPC; 1 page, Jun. 15, 2016.
European Patent Register for European Patent No. EP1952560; European Patent Application 06 828 846.3 based on International Patent Application No. PCT/EP2006/010163; Minutes of the Oral Proceedings before the Opposition Division; 1 page, Jun. 15, 2016.
European Patent Register for European Patent No. EP1952560; European Patent Application 06 828 846.3 based on International Patent Application No. PCT/EP2006/010163; Minutes of the Oral Proceedings; Conclusion of the Proceedings; 1 page, Jun. 15, 2016.
European Patent Register for European Patent No. EP1952560; European Patent Application 06 828 846.3 based on International Patent Application No. PCT/EP2006/010163; Minutes of the Oral Proceedings; Conclusion of the Proceedings; 2 pages, Jun. 15, 2016.
European Patent Register for European Patent No. EP1952560; European Patent Application 06 828 846.3 based on International Patent Application No. PCT/EP2006/010163; Internal Form—Opposition/Addresses; 1 page, Jun. 15, 2016.
European Patent Register for European Patent No. EP1952560; European Patent Application 06 828 846.3 based on International Patent Application No. PCT/EP2006/010163; Interlocutory Decision in Opposition Proceedings; 2 pages, Jun. 15, 2016.
European Patent Register for European Patent No. EP1952560; European Patent Application 06 828 846.3 based on International Patent Application No. PCT/EP2006/010163; Grounds for the Decision (Annex); 14 pages, Jun. 15, 2016.
European Patent Register for European Patent No. EP1952560; European Patent Application 06 828 846.3 based on International Patent Application No. PCT/EP2006/010163; Druckexemplar in Opposition Procedure; 16 pages, Jun. 15, 2016.
European Patent Register for European Patent No. EP1952560; European Patent Application 06 828 846.3 based on International Patent Application No. PCT/EP2006/010163; Interlocutory Decision in Opposition Proceedings (Art. 101(3)(a) and 106(2) EPC), 1 page, Jun. 15, 2016.
European Patent Register for European Patent No. EP1952560; European Patent Application 06 828 846.3 based on International

(56) References Cited

OTHER PUBLICATIONS

Patent Application No. PCT/EP2006/010163; Annex to the Communication—Opposition; 5 pages, Jun. 15, 2016.
European Patent Register for European Patent No. EP1952560; European Patent Application 06 828 846.3 based on International Patent Application No. PCT/EP2006/010163; Annex to a Communication; Auxiliary Request 3A, Claims (annotated and clean copy); 8 pages, Jun. 15, 2016.
European Patent Register for European Patent No. EP1952560; European Patent Application 06 828 846.3 based on International Patent Application No. PCT/EP2006/010163; Acknowledgement of a Document; 1 page, Jun. 15, 2016.
European Patent Register for European Patent No. EP1952560; European Patent Application 06 828 846.3 based on International Patent Application No. PCT/EP2006/010163; Advice of Delivery; 1 page, Jun. 17, 2016.
European Patent Register for European Patent No. EP1952560; European Patent Application 06 828 846.3 based on International Patent Application No. PCT/EP2006/010163; Advice of Delivery; 2 pages, Jun. 18, 2016.
European Patent Register for European Patent No. EP1952560; European Patent Application 06 828 846.3 based on International Patent Application No. PCT/EP2006/010163; Advice of Delivery; 1 page, Jun. 22, 2016.
European Patent Register for European Patent No. EP1952560; European Patent Application 06 828 846.3 based on International Patent Application No. PCT/EP2006/010163; Payment of Fees and Costs; 1 page, Aug. 25, 2016.
European Patent Register for European Patent No. EP1952560; European Patent Application 06 828 846.3 based on International Patent Application No. PCT/EP2006/010163; Notice of Appeal; 1 page, Aug. 25, 2016.
European Patent Register for European Patent No. EP1952560; European Patent Application 06 828 846.3 based on International Patent Application No. PCT/EP2006/010163; Processing of an Appeal; 2 pages, Aug. 29, 2016.
European Patent Register for European Patent No. EP1952560; European Patent Application 06 828 846.3 based on International Patent Application No. PCT/EP2006/010163; Commencement of Proceedings Before the Board of Appeal; 2 pages, Sep. 2, 2016.
European Patent Register for European Patent No. EP1952560; European Patent Application 06 828 846.3 based on International Patent Application No. PCT/EP2006/010163; Withdrawal of an opposition; 1 page, Sep. 23, 2016.
European Patent Register for European Patent No. EP1952560; European Patent Application 06 828 846.3 based on International Patent Application No. PCT/EP2006/010163; F3348 Confirmation of Withdrawal of the Opposition by the Respondent and Former Opponent; 2 pages, Sep. 30, 2016.
European Patent Register for European Patent No. EP1952560; European Patent Application 06 828 846.3 based on International Patent Application No. PCT/EP2006/010163; Statement of Grounds of Appeal; 9 pages, Oct. 25, 2016.
European Patent Register for European Patent No. EP1952560; European Patent Application 06 828 846.3 based on International Patent Application No. PCT/EP2006/010163; Claims; Auxiliary Request 1 (annotated and clean copy); 4 pages, Oct. 25, 2016.
European Patent Register for European Patent No. EP1952560; European Patent Application 06 828 846.3 based on International Patent Application No. PCT/EP2006/010163; Claims; Auxiliary Request 2 (annotated and clean copy); 5 pages, Oct. 25, 2016.
European Patent Register for European Patent No. EP1952560; European Patent Application 06 828 846.3 based on International Patent Application No. PCT/EP2006/010163; Claims; Auxiliary Request 3 (annotated and clean copy); 4 pages, Oct. 25, 2016.
European Patent Register for European Patent No. EP1952560; European Patent Application 06 828 846.3 based on International Patent Application No. PCT/EP2006/010163; Claims; Auxiliary Request 4 (annotated and clean copy); 5 pages, Oct. 25, 2016.
European Patent Register for European Patent No. EP1952560; European Patent Application 06 828 846.3 based on International Patent Application No. PCT/EP2006/010163; Composition of the Board; 1 page, Dec. 23, 2016.
European Patent Register for European Patent No. EP1952560; European Patent Application 06 828 846.3 based on International Patent Application No. PCT/EP2006/010163; Notice of Intervention to a European Patent; 5 pages, Nov. 14, 2017.
European Patent Register for European Patent No. EP1952560; European Patent Application 06 828 846.3 based on International Patent Application No. PCT/EP2006/010163; Intervention of the Assumed Infringer; 46 pages, Nov. 14, 2017.
European Patent Register for European Patent No. EP1952560; European Patent Application 06 828 846.3 based on International Patent Application No. PCT/EP2006/010163; Annexes Regarding Appeal Procedure; 23 pages, Nov. 14, 2017.
European Patent Register for European Patent No. EP1952560; European Patent Application 06 828 846.3 based on International Patent Application No. PCT/EP2006/010163; Annexes Regarding Appeal Procedure; 1 page, Nov. 14, 2017.
European Patent Register for European Patent No. EP1952560; European Patent Application 06 828 846.3 based on International Patent Application No. PCT/EP2006/010163; Annexes Regarding Appeal Procedure; 7 pages, Nov. 14, 2017.
European Patent Register for European Patent No. EP1952560; European Patent Application 06 828 846.3 based on International Patent Application No. PCT/EP2006/010163; Acknowledgement of Receipt; 2 pages, Nov. 14, 2017.
European Patent Register for European Patent No. EP1952560; European Patent Application 06 828 846.3 based on International Patent Application No. PCT/EP2006/010163; Intervention of the Assumed Infringer; 1 page, Nov. 15, 2017.
European Patent Register for European Patent No. EP1952560; European Patent Application 06 828 846.3 based on International Patent Application No. PCT/EP2006/010163; Intervention of the Assumed Infringer; 2 pages, Nov. 15, 2017.
European Patent Register for European Patent No. EP1952560; European Patent Application 06 828 846.3 based on International Patent Application No. PCT/EP2006/010163; Acknowledgement of Receipt; 2 pages, Nov. 15, 2017.
European Patent Register for European Patent No. EP1952560; European Patent Application 06 828 846.3 based on International Patent Application No. PCT/EP2006/010163; F3345 Forwarding of Submissions to Parties; 1 page, Jan. 16, 2018.
Baldemair et al., U.S. Appl. No. 13/950,546, Final Office Action from U.S. Patent and Trademark Office, dated Mar. 9, 2017.
Baldemair et al., U.S. Appl. No. 13/950,546, Non-final Office Action from U.S. Patent and Trademark Office, dated Sep. 15, 2015.
Baldemair et al., U.S. Appl. No. 13/950,546, Final Office Action from U.S. Patent and Trademark Office, dated Mar. 24, 2016.
Baldemair et al., U.S. Appl. No. 13/950,546, Advisory Action from U.S. Patent and Trademark Office, dated May 31, 2016.
Baldemair et al., U.S. Appl. No. 13/950,546, Non-final Office Action from U.S. Patent and Trademark Office, dated Aug. 11, 2016.
RU Application 2008119998/09 (023466) Russian Decision to Grant (with translation), dated Jun. 30, 2010.
JP2008-535982 (P21430JP1) Japanese Office Action (with translation), dated Oct. 19, 2011.
European Patent Office, *Communication*, Extended European Search Report for Application No. 13 187 367.1, 6 pages, dated Jul. 1, 2014.
European Patent Office, *Communication* Pursuant to Article 94(3) EPC, Application No. 13 187 367.1, 4 pages, dated Nov. 24, 2018.
Government of India Patent Office, Examination Report for Application No. 3199/DELNP/2008, 3 pages, dated Dec. 18, 2015.
Notice of Allowance and Fee(s) Due issued by the USPTO for U.S. Appl. No. 13/950,546—dated Oct. 9, 2018.
Office Action issued by the Brazilian Patent and Trademark Office DIPRA No. 007/16 for Patent Application No. PI0617648-8—dated May 25, 2018.

(56) References Cited

OTHER PUBLICATIONS

Intervention of Assumed infringer; Notice of Intervention to European Patent No. EP1952560; Appeal No. T1981/16-3.5.03, Intervener: Wiko Germany GmbH dated Nov. 14, 2017, with English translation—Jan. 16, 2018.
Intervention of Assumed Infringer; Notice of Intervention to European Patent No. EP1952560; Appeal No. T1981/16-3.5.03, Intervener: Wiko SAS dated Nov. 14, 2017, with English transhation—Jan. 16, 2018.
ETSI TS 125 221 V6.5.0; Technical Specification; Universal Mobile Telecommuinications System (UMTS); Physical channels and mapping of transport channels onto physical channels (TDD); (GPP TS 25.221 version 6.5.0 Release 6) Sep. 2005.
ETSI TS 125 224 V6.2.0; Technicat Specification; Universal Mobile Telecommunications System (UMTS): Physical layer procedures (TDD); (3GPP TS 25.224 version 6.2.0 Release 6)—Sep. 2004.
ETSI TS 125 224 V6.5.0; Technical Specification; Universal Mobile Telecommunications System (UMTS); Physical layer procedures (TDD); (3GPP TS 25.224 version 6.5.0 Release 6)—Jun. 2005.
ETSI TS 125 331 V6.7.0; Technical Specification; Universal Mobile Telecommunications System (UMTS); Radio Resource Control (RRC) protocol specification; (3GPP TS 25.331 version 6.7.0 Release 6) NOTE: Due to size, this reference has been split into four parts (Part A, Part B, Part C, and Part D)—Sep. 2005.
ETSI TS 125 401 V6.7.0; Technical Specification; Universal Mobile Telacommunications System (UMTS); UTRAN overall description; (3GPP TS 25.401 version 6.7.0 Release 6)—Sep. 2005.
ETSI TS 125 402 V6.3.0; Technical Specification; Universal Mobile Telecommunications System (UMTS); Synchronization in UTRAN; Stage 2; (3GPP TS 25.402 version 6.3.0 Release 6)—Jun. 2005.
R1-080560; Title: Random Access and UL Sync Canisderations and Discussion of L1 Questions from RAN2, Source; Philips, 3GPP TSG RAN WG1 Meeting #44; Denver, Colorado, USA—Feb. 13-17, 2006.

R2-699840; Title: Description of the Timing Advance Mechanism for TDD; Source: Siemens AG; TSG-RAN Working Group 2 (Radio layer 2 and Radio layer 3); Sophia-Antipolis—Aug. 16-20, 1999.
R2-060967; Title: DRX and DTX in LTE_Active; Source Ericsson; TSG-RAN WG2 Meeting #52, Athens, Greece—Mar. 27-31, 2006.
IEEE Standard 802.16 for Local and metropolitan area networks; Part 16; Air Interface for Fixed Broadband Wireless Access Systems—Oct. 1, 2004.
IEEE Standard 802.16e for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1—Feb. 28, 2006.
IEEE C802.16e-04/300r1; Project: IEEE 802.16 Broadband Wireless Access Working Group; Title: Enhanced Initial Ranging and BW Request Ranging; Re: IEEE P802.16e/D4-2004—Aug. 28, 2004.
IEEE C802.16e-05/222r0; Project: IEEE 802.16 Broadband Wireless Access Working Group; Title: Fix problems in Feedback Polling IE; Re: Response to Sponsor Ballot on IEEE 802.16e/D7 document—Apr. 27, 2005.
Office Action Summary Issued for U.S. Appl. No. 13/950,546, filed Jul. 25, 2013 for Inventor: Baldemair—dated Oct. 5, 2017.
Hearing Notice 3199/DELNP/2008 issued by the Indian Patent Office for Application No. 3199/DELNP/2008—May 19, 2017.
Extended European Search Report dated Oct. 15, 2013 in EP application 13175854.2.
International Search Report for PCT/EP2006/010163 dated Feb. 20, 2007.
International Preliminary Report on Patentability for PCT/EP2006/010163.
Written Opinion of the International Searching Authority for PCT/EP2006/010163.
English Translation of Chinese Office Action issued in Application No. 200680039321.6 dated Jun. 27, 2012.

\* cited by examiner

TECHNIQUE FOR PERFORMING A RANDOM ACCESS PROCEDURE OVER A RADIO INTERFACE

PRIORITY

This application is a continuation under 35 U.S.C. § 120 of U.S. application Ser. No. 14/644,327, now U.S. Pat. No. 10,492,226; which is a continuation, under 35 U.S.C. § 120, of U.S. application Ser. No. 13/950,546 filed Jul. 25, 2013, now U.S. Pat. No. 10,219,302; which is a continuation, under 35 U.S.C. § 120, of U.S. application Ser. No. 12/091,055, filed Sep. 23, 2008, now U.S. Pat. No. 8,503,426, which is a U.S. National Stage Filing under 35 U.S.C. § 371 of International Patent Application Serial No. of PCT/EP2006/010163 filed Oct. 20, 2006, which claims priority to Swedish Patent Application No. 0502349-4 filed on Oct. 21, 2005, all of which are incorporated herein by reference.

FIELD OF THE INVENTION

The present invention generally relates to radio interfaces of wireless networks, and in particular to air interfaces of mobile networks. More specifically, the invention relates to a technique for performing a random access procedure over a radio interface.

BACKGROUND OF THE INVENTION

Today, not only mobile telephones but also other mobile terminals, such as PDAs (Personal Digital Assistants), notebooks, etc., exchange data with wireless networks via radio interfaces. Typically, a radio base station of a network serves the mobile terminal by routing data received from the terminal through the network towards the recipient, and by transmitting data received from the network side over the radio interface towards the mobile terminal.

The available transmission resources such as frequency (bandwidth), time (timeslots available in transmission frames) and transmission power are generally limited and therefore have to be used as efficiently as possible. In this respect, the base station controls not only the resource parameters for downlink transmissions (from the base station to the terminal), but also for the uplink transmissions (from the terminal to the base station). For the uplink, the base station has to ensure that the mobile terminal is synchronized with the transmission scheme of the radio interface with appropriate accuracy. To this end the base station analyzes a received uplink signal, derives appropriate adjustment values for the uplink transmission parameters used by the terminal and sends synchronization information indicating the necessary adjustments towards the mobile terminal, which then has to adjust its transmission parameters accordingly. The synchronization information may comprise (for one or more of the transmission parameters) either a value for the transmission parameter itself or an adjustment value enabling the terminal to adjust the transmission parameter accordingly.

Whereas the synchronization of the mobile terminal may be performed in a straightforward manner in case of an existing uplink connection during which signals from the terminal are continuously received and analyzed at the base station, no such analysis is possible in case the terminal wants to connect for the first time (for example at power-up or during a handover) or from a standby status (in which the terminal only listens to the downlink). In these circumstances a random access procedure has to be performed to achieve synchronization.

The random access procedure serves several other purposes also. For example the terminal needs an (at least temporary) identification to be addressable by the base station. Further, the terminal needs to provide some information such that the base station can decide to grant access to the network. Additionally, some information regarding the required uplink/downlink resources has to be exchanged.

Any resource allocation, for example the resource allocation for the random access procedure itself, is based on the transmission scheme utilized over the radio interface. A straightforward allocation scheme may comprise reserving in a semi-permanent way a particular channel, which may be specified by particular orthogonal resources such as time slot(s) and frequency band(s), which then may be used by the terminal for its uplink transmission. However, the reserved resources are then blocked for use by other terminals, which means that resources are wasted in case the mobile terminal does not use the reserved channel to its full extent (for example because the transmission buffer is momentarily empty). On the other hand, the reserved resources may not be sufficient to allow fast transmission of data in case the transmission buffer is full. As a further drawback, this straightforward allocation scheme is dimension-limited, i.e. only a particular number of users (determined by the available orthogonal resources) can be served.

During the random access procedure, uplink transmission parameters such as time, frequency and power are not accurately aligned with the transmission scheme as predetermined by the radio base station. Therefore, in an orthogonal scheme additional resources have to be provided for the random access to avoid interference of the typically misaligned random access bursts with synchronized normal bursts, which are, for instance, transmitted in neighbouring time slots. These extra resources comprise for example guard periods and guard bands in the time and frequency dimension, respectively.

In another transmission scheme known for example from WCDMA (Wideband Code Division Multiple Access) systems, the uplink channel provided to the terminal is based on non-orthogonal resources, i.e. the terminal may sent its data using arbitrary time slots and/or frequency bands. While such a system is not dimension-limited, inter-user interference increases with increasing numbers of concurrently sending terminals, which degrades the performance and thus the throughput. In addition, fast power control is required to accurately control the transmission power of each terminal.

There is thus a need for a resource-efficient random access procedure which addresses at least some of the drawbacks set forth above.

SUMMARY OF THE INVENTION

According to a first aspect of the invention, a method of performing a random access procedure over a radio interface is proposed. The method comprises the steps of transmitting a synchronization request for synchronization information; receiving synchronization information in response to the synchronization request; and transmitting, based on at least one transmission parameter adjusted (e.g. set or changed) in accordance with the synchronization information, a resource request for data transmission resources.

The radio interface may be the air interface of a mobile network, for example a GSM (Global System for Mobile Communication) or UMTS (Universal Mobile Telecommunication System) network. The method may be performed in a mobile terminal requesting access to a radio base station of a wireless network serving the radio interface or in any other device during a random access procedure.

The steps of transmitting a synchronization request and of receiving synchronization information may be performed with the intention to achieve symbol accurate synchronization between the mobile terminal and the radio base station, i.e. any transmission of the terminal during a particular time slot will have to fit into the corresponding time slot at the base station such that none of the transmitted symbols exceeds the base station time slot.

The synchronization request may be represented by an access burst, which is formed to enable the base station to analyze, e.g. based on the frequency band and time period occupied by the access burst, the alignment of transmissions from the terminal with the transmission scheme provided by the base station. Additionally the base station may be enabled to provide (adjustment) values in the synchronization information to the mobile terminal.

The synchronization request may carry only a limited amount of information which is required for synchronizing the mobile terminal with the base station. For example, a temporary or random identification (ID) of the terminal may be provided, which is particularly suited for the synchronization steps. As, for example, the ID may only be used for the synchronization steps, it may comprise only a small number of bits. On the other hand, information related to network admission or requested resources may be omitted in the synchronization request.

A mobile terminal may adjust its transmission parameters according to the received synchronization information. The resource request therefore may already be transmitted using a normal burst with a symbol-accurate alignment over the radio interface. The resource request may specify resources required for an exchange of user and/or control data. As an example, for a location update the mobile terminal may request the assignment of a dedicated control channel. As another example, for the transfer of user data (e.g., application data) the terminal may request the assignment of a data channel with a particular bandwidth (e.g. for streaming data) or may request the assignment of transmission resources for a specific amount of data.

In one variant of the invention, the method may comprise the further steps of receiving resource information in response to the resource request and transmitting data using resources in accordance with the resource information. The base station may provide further control information along with the resource information to the mobile terminal, for example a temporary ID which may replace an ID used during the synchronization steps and may comprise, e.g., a larger number of bits.

The method may comprise the step of transmitting, in case further data is to be transmitted, at least one further resource request. No preceding synchronization may be required in this case.

In one implementation of the invention, the method comprises the step of starting a synchronization timer in response to at least one of the reception of synchronization information and the transmission of data. Synchronization between terminal and base station can often be maintained as long as the terminal sends data, as then the base station can analyse the received signals. In case no data is transmitted, synchronization may fade away within a particular time period. The synchronization timer may thus be set appropriately to guarantee a predefined synchronization level.

The expiry time of the synchronization timer may be set according to a prediction of a validity of the synchronization information. For example, the expiry time may be set according to tolerances related to the electronic circuitries in the mobile terminal and the base station. In one variant of the invention, the expiry time of the synchronization timer may be set according to a measured relative velocity. For example, if a mobile terminal moves with a high velocity relative to the base station, the expiry time may be set to a short value. The expiry time of the synchronization timer may also be based on a prediction of a cell change of the terminal, which requires synchronization with a new base station.

The method may comprise the transmission of a further synchronization request on expiry of the synchronization timer. In this variant, the expiry time may take into account any fading in the synchronization.

In some implementations of the invention, the method comprises the further step of transmitting a ping signal for keeping synchronization. The ping signal may comprise an empty or a dummy payload, but may also comprise signalling data which has been purposefully kept in the transmission buffer for being transmitted with the ping signal. The ping signal may be sent before synchronization has faded away, such that the signal may use a normal (regular) transmission resource and ensures in a resource-efficient way that synchronization is maintained over the radio interface. In case no signalling data is to be transmitted, the ping signal may comprise the least possible amount of data (to not waste resources over the radio interface).

The ping signal may be transmitted on expiry of the synchronization timer. In this case the expiry time may be set to a value smaller than the synchronization fade away time. Additionally or alternatively, the ping signal may be transmitted in response to a polling request received over the radio interface. The base station may be configured to send periodically or on a need basis the polling request to trigger the transmission of signals from the mobile terminal.

According to a second aspect of the invention, a method of performing a random access procedure for a radio interface is proposed, wherein the method comprises the steps of receiving a synchronization request for synchronization information; transmitting, based on the synchronization request, the synchronization information; and receiving, based on at least one transmission parameter adjusted according to the synchronization information, a resource request for data transmission resource.

The method may be performed in a radio base station serving the radio interface. For example, the radio base station may be a BTS (Base Transceiver Station) or BSC (Base Station Controller) of a base station subsystem in a GSM network, or the base station may be a Node-B or RAN-controller in an UMTS network.

The synchronization request may have been transmitted over the radio interface by a mobile terminal. The radio base station may analyze the received synchronization request (which may be represented by an access burst) to calculate at least one transmission parameter adjustment value and thus to determine synchronization information for aligning the transmissions of the mobile terminal with the transmission scheme provided by the radio base station. Based on the synchronization information, the terminal may adjust one or more of its transmission parameters and may then transmit, based on the adjusted transmission parameter(s), a resource request.

The radio base station may further perform the steps of transmitting resource information in response to the resource request; and scheduling resources according to the resource information. In one implementation of the invention, the method comprises the step of receiving at least one further resource request for further data transmission. As long as the mobile terminal and the radio base station are synchronized with each other, no repetition of the initial synchronization steps is required.

In one variant of the invention, the method comprises the step of starting a synchronization timer in response to at least one of reception of the synchronization request, reception of the resource requests and reception of data. The timer value may be predefined or may be set according to information included in the received synchronization request. This implementation may further comprise the step of transmitting, on expiry of the synchronization timer, a request for a ping signal. In that case the expiry time of the timer might be set such that synchronization is presumably still accurate enough and the ping signal may be sent in the form of a normal transmission burst. Additionally or alternatively, the radio base station may determine if a request for a ping signal is to be transmitted based on an analysis of regular uplink traffic.

According to a further aspect of the invention, a computer program product is proposed, which comprises program code portions for performing the steps of any one of the method aspects of the invention described herein, when the computer program product is executed on one or more computing devices, for example a mobile terminal or a radio base station of a wireless network. The computer program product may be stored on any computer readable recording medium, for example a hard-drive, memory, CD-Rom or DVD. Additionally or alternatively, the computer program product may be provided for download by a download server. The downloading may be achieved, for example, via the Internet.

According to a further aspect of the invention, a mobile terminal is proposed, which is adapted for performing a random access procedure over a radio interface. The device comprises a sync-request component adapted for transmitting a synchronization request for synchronization information; a sync-response component adapted for receiving synchronization information associated to the synchronization request; and a transmission control component adapted for transmitting, based on at least one transmission parameter adjusted according to the synchronization information, a resource request for data transmission resource.

According to a still further aspect of the invention, a radio base station is proposed, which is adapted for performing a random access procedure over a radio interface. The base station comprises a sync-request component adapted for receiving a synchronization request for synchronization information; a sync-response component adapted for transmitting, based on the synchronization request, the synchronization information; and a resource request component adapted for receiving, based on at least one transmission parameter adjusted according to the synchronization information, a resource request for data transmission resources. The sync-request component may comprise a sub-component adapted to calculate, based on the received synchronization request, at least one transmission parameter adjustment value.

BRIEF DESCRIPTION OF THE DRAWINGS

In the following, the invention will further be described with reference to exemplary embodiments illustrated in the drawings, in which.

DETAILED DESCRIPTION OF THE PREFERRED EMBODIMENTS

In the following description, for purposes of explanation and not limitation, specific details are set forth, such as specific network types including particular network nodes, communication protocols etc., in order to provide a thorough understanding of the current invention. It will be apparent to one skilled in the art that the current invention may be practised in other embodiments that depart from these specific details. For example, the skilled artisan will appreciate that the current invention may be practised with wireless networks different from the mobile network discussed below to illustrate the present invention. Rather, the invention may be practised with any wireless network in which a random access procedure is performed over the radio interface. This may include for example HIPERLAN networks (HIPERLAN is a standard for wireless local area networks).

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the current invention is described as a method, it may also be embodied in a computer processor and a memory coupled to a processor, wherein the memory is encoded with one or more programs that perform the methods disclosed herein when executed by the processor.

Figure 1:
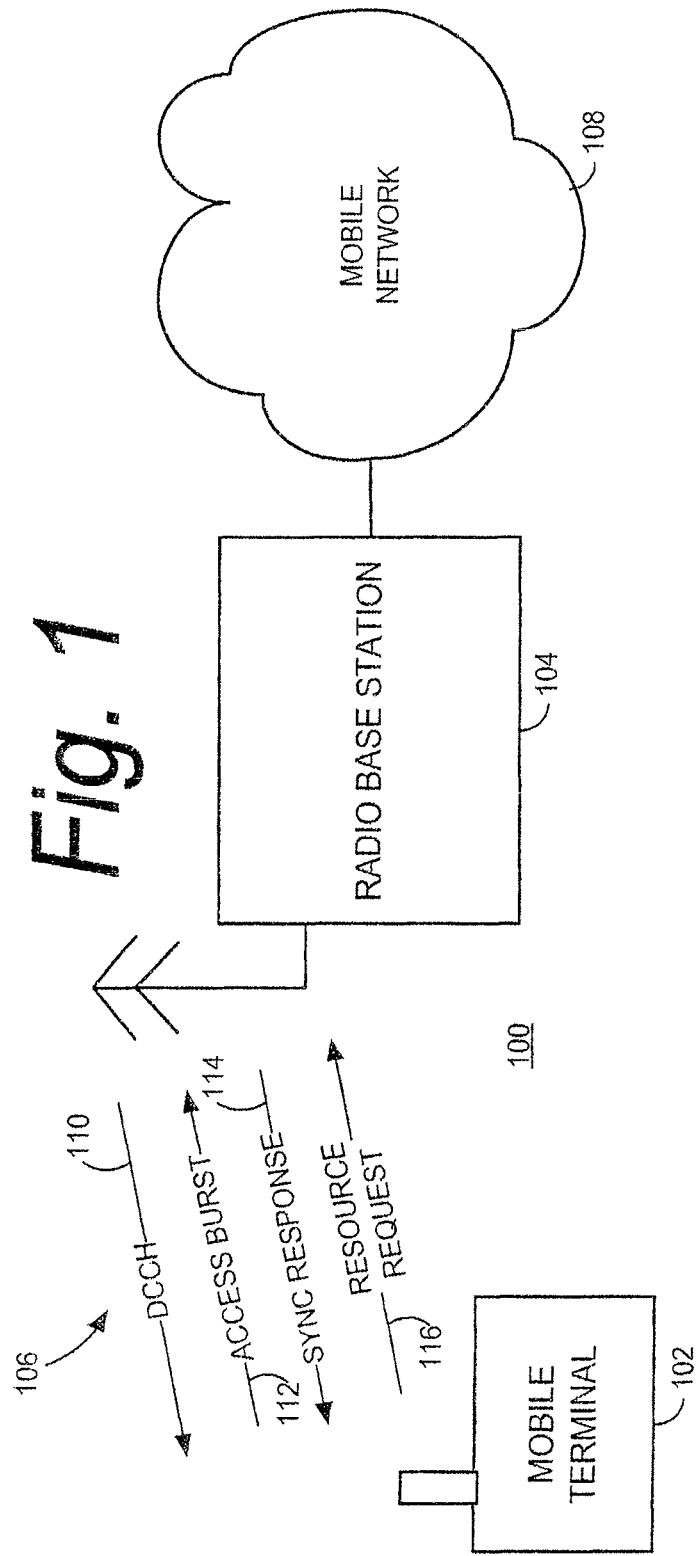
FIG. 1 is a schematic illustration of an embodiment of a communication system.

FIG. 1 schematically illustrates an embodiment of a communication system 100 including a mobile terminal 102 and a radio base station 104 which may exchange data with each other via a radio interface 106. The base station 104 belongs to a mobile network 108.

In order to set up a connection for data exchange, the mobile terminal 102 has to get access via the base station 104 to the network 108. A random access procedure has to be performed for synchronizing the terminal with the transmission scheme of the radio interface 106 and for granting resources to the terminal (and possibly other purposes). As a preparatory step, the terminal 102 listens to a downlink control channel (DCCH) 110, which is broadcasted by the base station 104 into the served radio cell. The DCCH may announce, for example, cell ID and network ID, channel configurations related to the utilized transmission scheme, random access related information, and parameters for connection setup.

Based on the broadcasted information, the mobile terminal 102 then performs the random access procedure. The procedure includes the transmission of an access burst 112 representing a synchronization request for synchronization information. The radio base station 104 analyzes the access burst 112, determines transmission parameter settings or adjustments to align the transmissions of the terminal 102 with the transmission scheme over the radio interface 106 and sends synchronization information including appropriate transmission parameter setting or adjustment values in a synchronization response 114 to the terminal 102.

The mobile terminal 102 extracts the transmission parameter setting or adjustment values from the synchronization response 114 and sets or adjusts its transmission parameters accordingly. Based on the new transmission parameters, the terminal 102 then transmits a resource request 116 indicating requested transmission resources. The base station 104 then may provide appropriate resources for data exchange (uplink, downlink) at the radio interface 106 to the mobile terminal 102.

Figure 2:
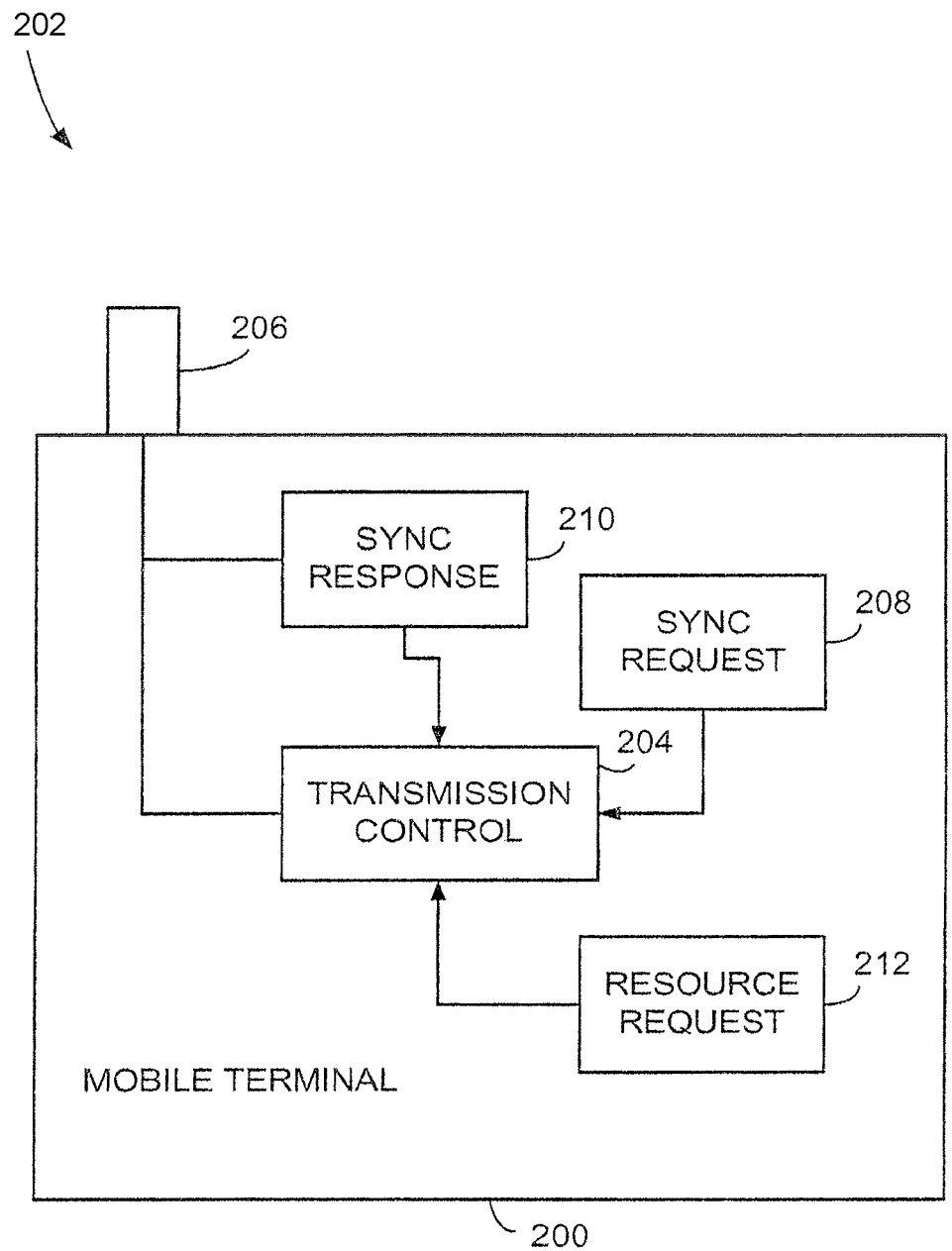
FIG. 2 is a functional block diagram schematically illustrating an embodiment of a mobile terminal.

FIG. 2 schematically illustrates functional building blocks of an embodiment of a mobile terminal 200, which is adapted for performing a random access procedure over a radio interface 202. The terminal 200 may be an implementation of the mobile terminal 102 of FIG. 1.

The terminal 200 comprises a transmission control component 204 which is adapted to control transmissions via an antenna 206 over the radio interface 202. The terminal 200 further comprises a sync-request component 208, which is adapted for transmitting a synchronization request for synchronization information. The component 208 constructs the request and provides it to the transmission control component 204, which then controls the transmission of an access burst accordingly.

The terminal 200 further comprises a sync-response component 210, which is adapted for receiving synchronization information in response to the synchronization request. The component 210 receives a synchronization response from the radio interface 202, extracts the synchronization information and provides an indication of adjusted transmission parameters to the transmission control component 204, which controls subsequent transmissions accordingly.

A resource request component 212 prepares a resource request for data transmission resources for transmission of data over the radio interface 202. The resource request is provided to the transmission control component 204, which is adapted for transmitting the request according to the adjusted transmission scheme, i.e. based on at least one transmission parameter adjusted according to the synchronization information, over the radio interface 202.

Figure 3:
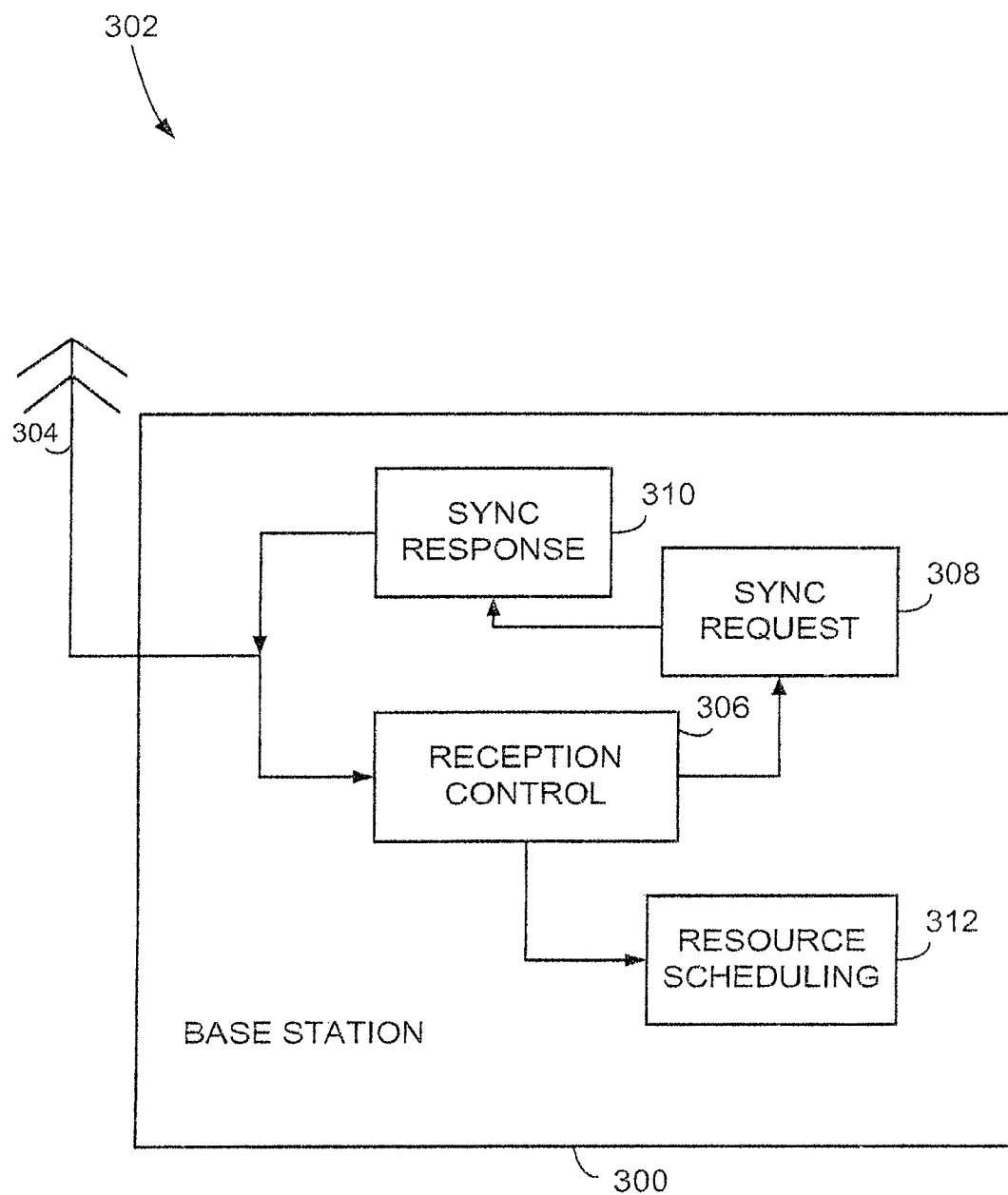
FIG. 3 is a functional block diagram schematically illustrating an embodiment of a radio base station.

FIG. 3 schematically illustrates the functional building blocks of an embodiment of a radio base station 300, which is adapted for performing a random access procedure over a radio interface 302. The base station may be an implementation of the base station 104 of FIG. 1.

The radio base station comprises an antenna 304 for receiving a transmission information via the radio interface 302. The base station 300 further comprises a reception control component 306, which may include, e.g., filters for separating the various uplink transmission channels provided for the radio interface 302. The base station 300 further comprises a sync-request component 308, which is adapted for receiving a synchronization request for synchronization information. The component 308 analyses the received access burst and determines misalignments with the transmission scheme provided by the base station 300 for the radio interface 302. For example, the component 308 may determine the timing advance value required for proper alignment of the transmission timings scheme of a mobile terminal with the time slot scheme supported by the base station 300. Another example of such a misalignment is a frequency offset that should be corrected for proper alignment of the transmission scheme of a mobile terminal with the transmission scheme supported by the base station 300.

The sync-request component 308 provides an indication of transmission parameter adjustments to a sync-response component 310, which prepares a synchronization response including synchronization information indicating the transmission parameter adjustments. The sync-response component 310 may be a sub-component of a transmission control component (not shown) of the base station 300 which generally controls transmissions of the radio base station over the radio interface 302.

The radio base station 300 further comprises a resource scheduling component 312, which is adapted for receiving, based on at least one transmission parameter adjusted according to the synchronization information, a resource request for data transmission resources. One or more particular uplink channels may be provided in the transmission scheme supported by the base station 300 for transmitting resource requests. The component 312 may then determine appropriate transmission resources and may trigger the transmission of an indication of the provided resources to the requesting mobile terminal.

Figure 4:
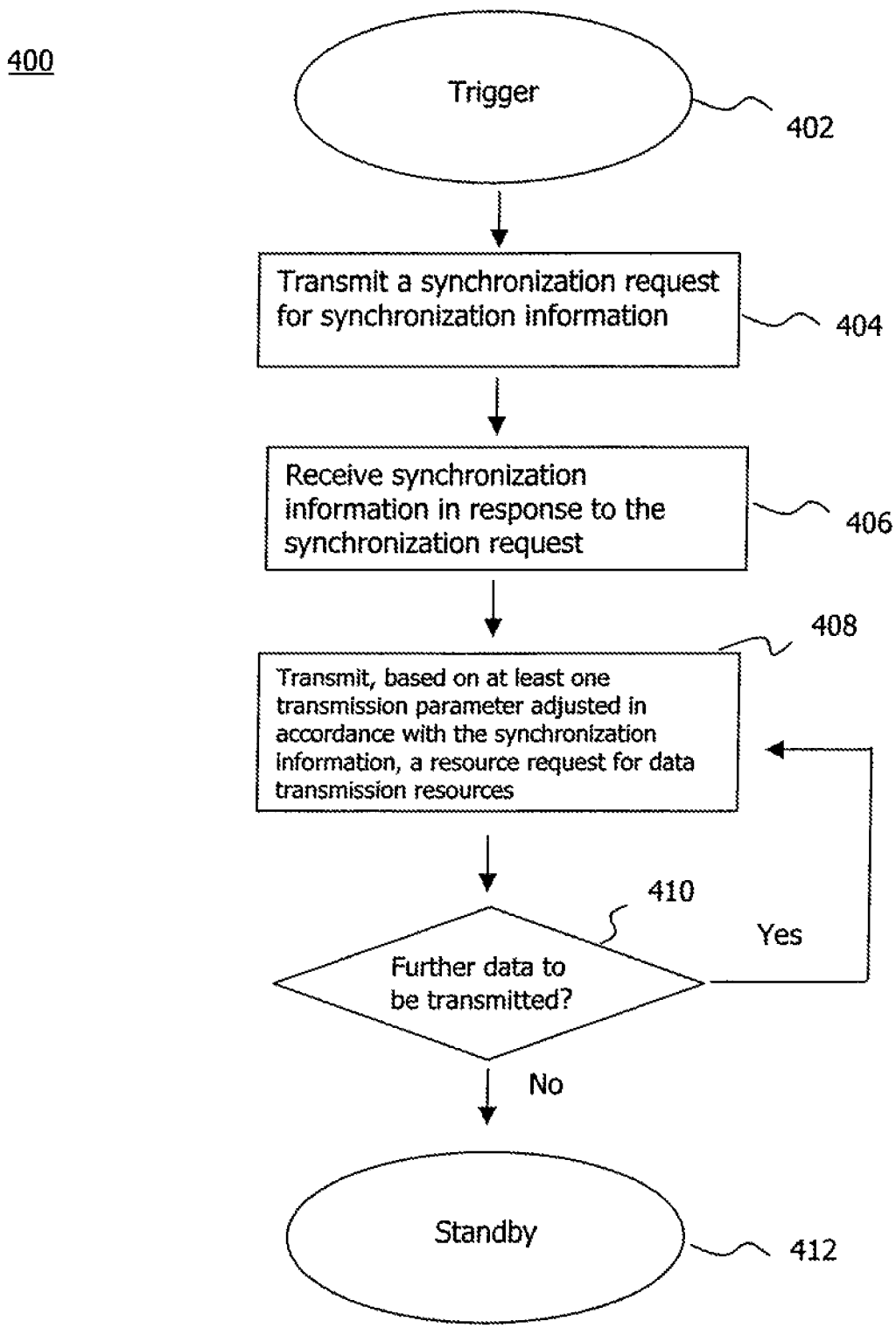
FIG. 4 is a flow diagram schematically illustrating steps of an embodiment of a method for performing a random access procedure over a radio interface in a mobile terminal.

FIG. 4 schematically illustrates the steps of an embodiment of a method 400 for performing a random access procedure over a radio interface, which may for example be performed in the mobile terminal 102 of FIG. 2 or in mobile terminal 200 of FIG. 2.

The method is triggered in step 402, for example by a control signal indicating that a random access procedure has to be performed in order to exchange data over a radio interface. In step 404, a synchronization request for synchronization information is transmitted. In step 406, synchronization information is received in response to the synchronization request. In step 408, based on at least one transmission parameter adjusted in accordance with the synchronization information, a resource request for data transmission resources is transmitted. Based on the resource request, resource information may be received (not shown) and data may be transmitted using resources in accordance with the resource information. In case further data is to be transmitted (step 410), a further resource request is transmitted. In case no data is to be transmitted anymore, the method ends in step 412 with the mobile terminal going into, e.g., standby status.

Figure 5:
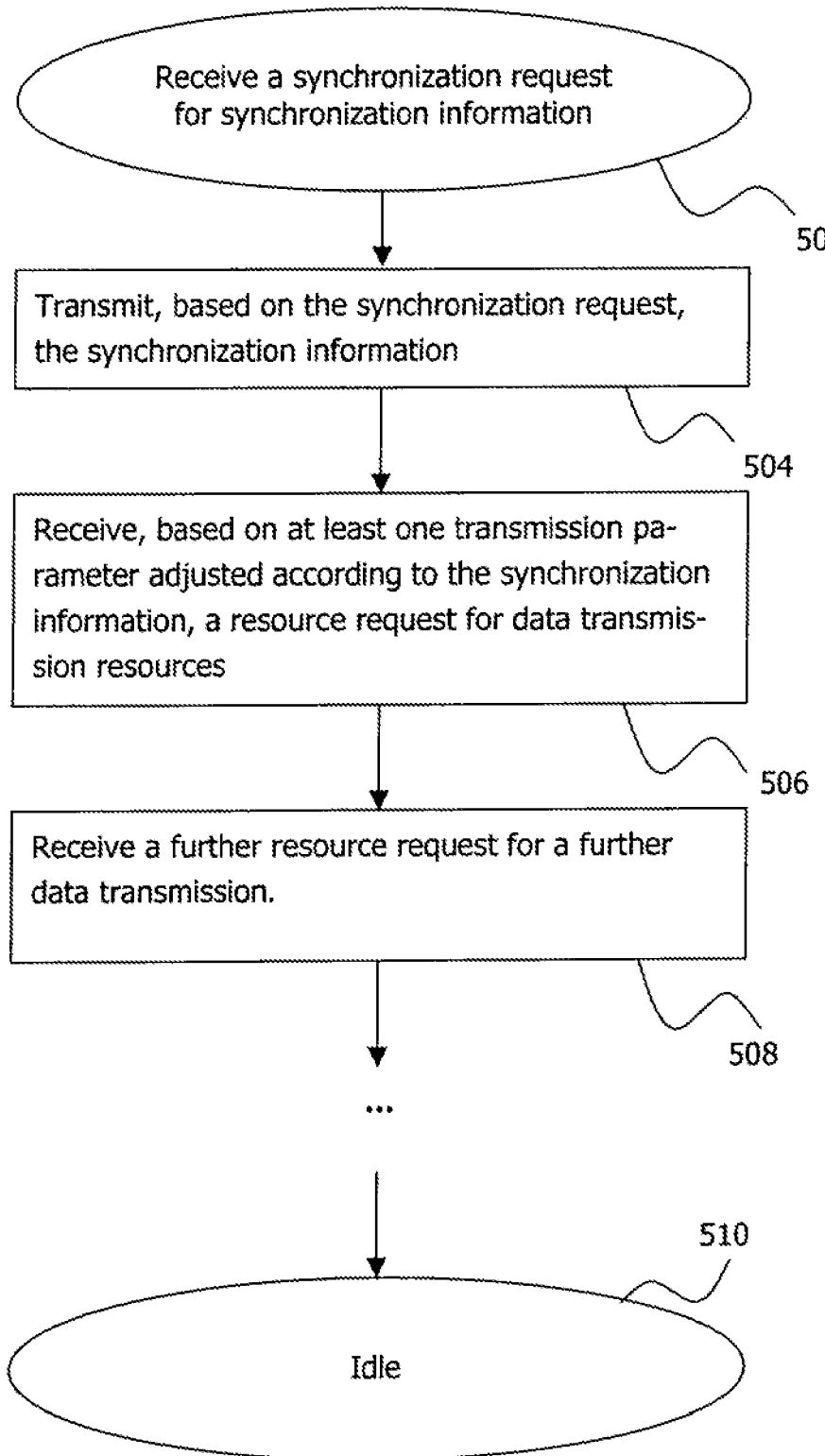
FIG. 5 is a flow diagram schematically illustrating an embodiment of a method for providing a random access channel for a radio interface in a radio base station.

FIG. 5 schematically illustrates the steps of an embodiment of a method 500 of performing a random access procedure over a radio interface, which may be executed in a radio base station, for example the radio base station 104 of FIG. 1 or base station 300 of FIG. 3.

The method starts in step 502 with the reception of a synchronization request for synchronization information. Based on the received request, at least one transmission parameter adjustment value may be calculated. In step 504, synchronization information is transmitted based on the synchronization request. In step 506, a resource request for data transmission resource is received, which is based on at least one transmission parameter adjusted according to the synchronization information. In response to the resource request, resource information may be transmitted (not shown) and resources may be scheduled in the base station according to the resource information. In step 508 and possibly further subsequent steps, a further resource request may be received for a further data transmission. In step 510, the method ends.

Figures 6A, 6B:
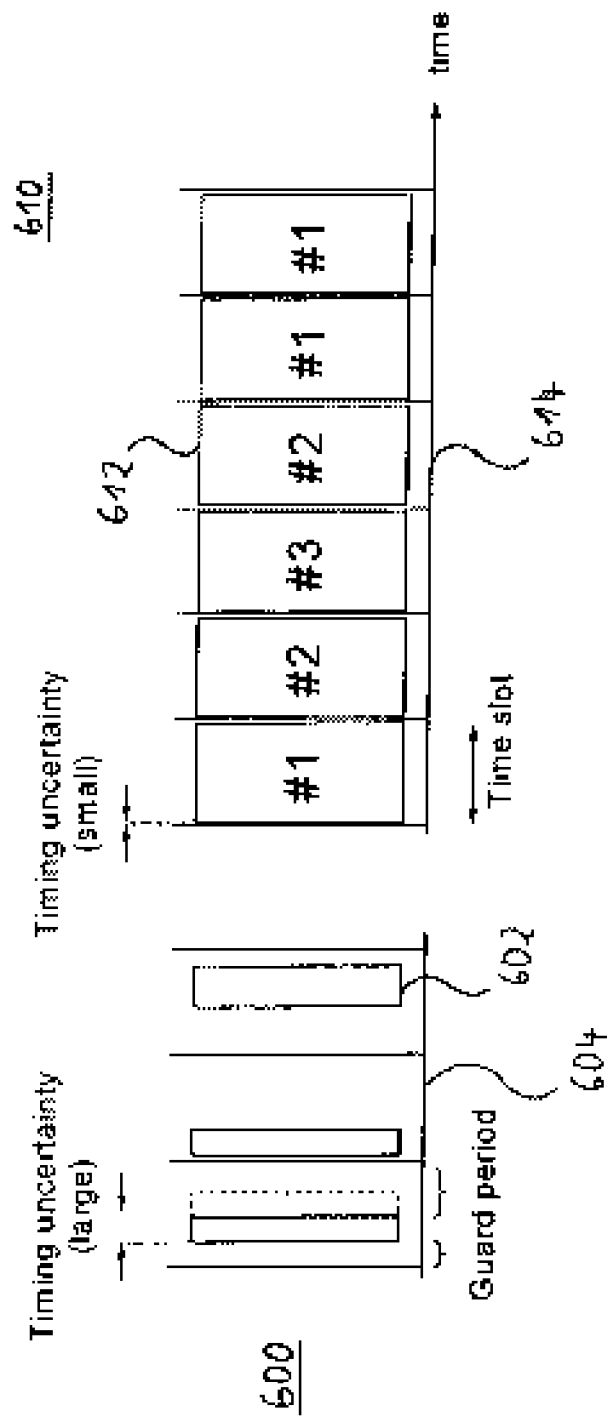
FIGS. 6A, 6B schematically illustrate a first and second embodiment of a data transmission scheme.

FIG. 6A illustrates an embodiment of a random access channel 600 with time extending to the right and frequency extending upwards. Access bursts 602 are transmitted in time slots 604. Each access burst 602 may represent a synchronization request. As the timing of the access bursts 602 is not exactly aligned with the timing of the time slots 604 of the base station serving the radio interface, guard periods have to be provided within each access time slot 604. As a result, the time resources reserved for the random access channel 600 are used with a lower efficiency.

FIG. 6B illustrates an embodiment of a transmission scheme 610 in which the transmission bursts 612 are accurately aligned with the time slots 614. The time slots 614 may be assigned to the transmission of user or control data. As an example, the time slots designated as #1, #2 and #3 may be assigned to transmissions of three mobile terminals. The transmission parameters of each of the mobile terminals are accurately adjusted, therefore only small guard periods are required. Vice versa, the transmission bursts carrying the transmission data may fill the time slots to a large extent, such that the available transmission resources are efficiently used.

FIGS. 6A and 6B illustrate the inefficient and the efficient use of time resources over a radio interface without and with proper alignment. Similar relations hold for other resources such as frequency and transmission power.

Figure 7:
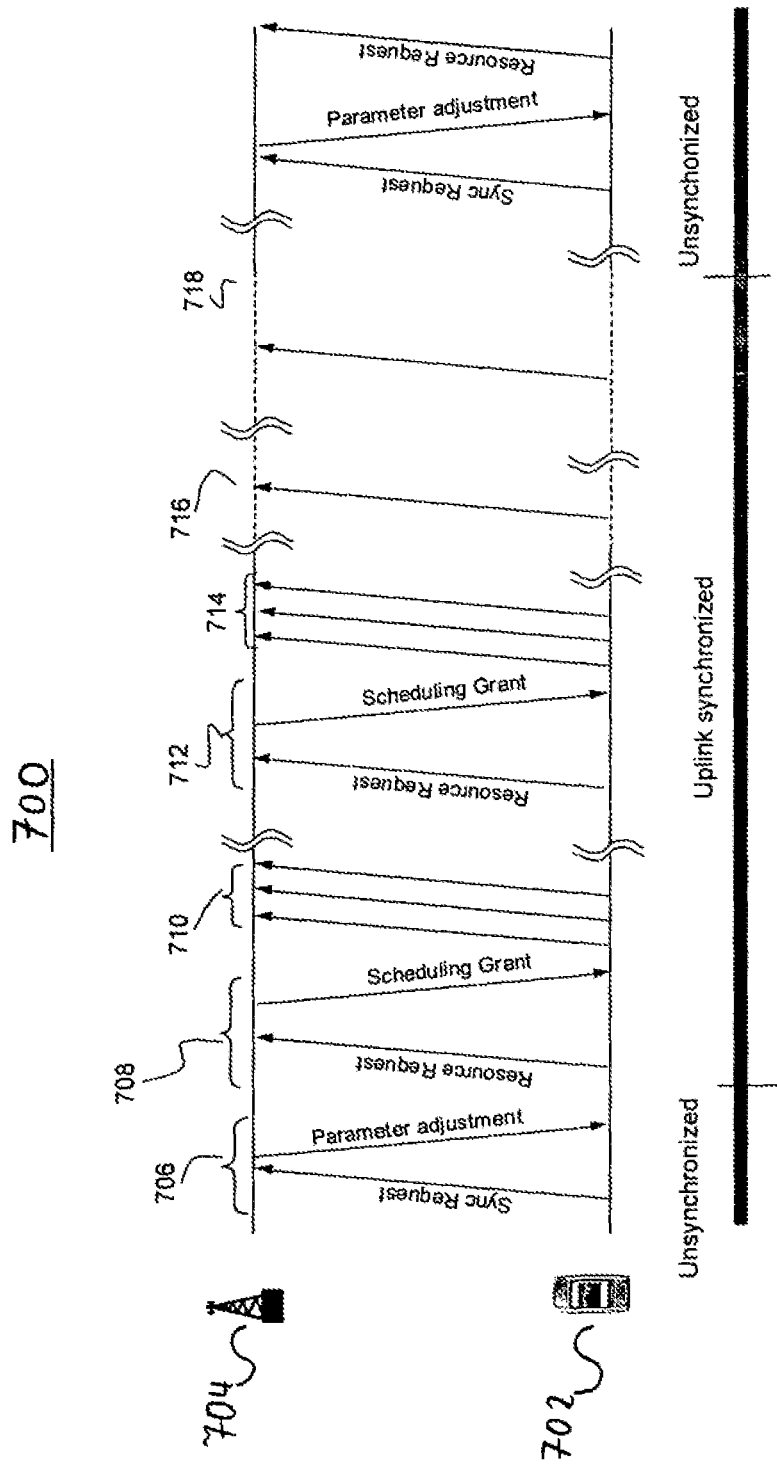
FIG. 7 schematically illustrates a sequence of transmissions between a mobile terminal and a base station.

FIG. 7 schematically illustrates communications between a mobile terminal 702 and a radio base station 704 in an exemplary embodiment. In steps 706, a synchronization request is sent by the terminal 702 to the base station 704 requesting adjustment values for transmission parameters. As the access burst uses the transmission resources with low efficiency (see FIG. 6A), the information included in the synchronization request is restricted to a minimum. For example, no transmission resources are requested with the synchronization request. In response to the synchronization request, the network, i.e. the base station 704 and/or another access control node of the network, analyses the access burst carrying the synchronization request to determine transmission parameter adjustments. Theses adjustments are provided as synchronization information to the terminal 702.

In the steps 708, a resource request is sent from the mobile terminal 702 to the base station 704. The request may contain, for example, information regarding the terminal identity, an amount of data and/or a required bandwidth, a priority assigned to the data (if any), the amount of transmission power available, and further information related to the requested uplink data transmission. The resource request is transmitted using transmission parameters that have been set in accordance with the synchronization information received from the base station 704; therefore transmission resources are used efficiently (see FIG. 6B). In steps 710, further data are transmitted using the scheduled resources.

A complete random access procedure as performed before a connection set-up of the terminal 702 may comprise at least the synchronization steps 706 and the resource assignment steps 708. In case further data are to be transmitted, the terminal 702 may transmit in steps 712 a further resource request, which may be answered by the base station 704 with a further grant of resources in the uplink. It is assumed that at this time the uplink is still in synchronization, thus a repetition of the steps 706 can be skipped. Further data may be transmitted in steps 714.

The uplink will generally stay in synchronization as long as the terminal is transmitting data in the uplink as the base station typically analyzes the received signals and determines transmission parameter adjustment values. Updated parameter adjustments may then continuously be provided to the terminal. This procedure can not be performed in case the terminal has stopped data transmission in the uplink. Accordingly, after a certain time the transmission parameters will no longer be valid, i.e. synchronization has faded away.

A timer mechanism may be used in one or both of the mobile terminal and the base station. This mechanism provides an indication related to the validity of the uplink transmission parameters used by the mobile terminal. As an example, the timer may be (re)started in case the terminal has just received an update of its transmission parameters or in case the terminal has transmitted uplink data. In one embodiment, on expiry of the timer the uplink transmission parameters are considered to be outdated and a (re)synchronization is required prior to any (further) data transmission. The value of the timer may either be set to a fixed value, or may be configurable by the network (the base station) or by the terminal. For example, the timer value may depend on the velocity of the terminal relative to the base station. A smaller timer value may be used in case the terminal moves with a high velocity.

In an alternative embodiment, which is illustrated in FIG. 7, the timer is set to an expiry value such that it expires with a high likelihood before the synchronization between terminal 702 and base station 704 has faded away. In this configuration, some arbitrary signal can be transmitted to the base station, which only has to satisfy the requirement that the base station may analyse the synchronization status. For example, a "ping" mechanism may be used in this request: The terminal transmits a "ping" signal (step 716), which analogously to the "ping" mechanism known from the Internet area carries an empty payload or a dummy payload and serves the only purpose to provide the basis for a measurement of the uplink synchronization. The ping signal may be used in case no other data has to be transmitted in the uplink. In case some uncritical data has to be transported over the uplink, transmission of these data may be delayed until a ping signal is to be sent; in this case the ping signal may carry the uncritical data instead of an empty or a dummy payload. As an example, the ping signal may be used for the transport of channel quality reports. The ping signal may be transmitted at regular intervals as long as no other user data are available for uplink transmission. The ping interval may be fixedly configured in the network and/or the terminal, but may also be configured according to the terminal situation. For example, the ping signal may be sent with a high frequency in case the terminal moves with a high velocity. An estimation of the terminal speed may be based on measurements of the network and/or the terminal or may be based on the size of the timing adjustment values provided in the downlink.

If no signalling or user data has been scheduled for transmission during a particular time period, which may be predetermined, the terminal may stop the ping procedure (step 718 in FIG. 7), such that the uplink goes out-off-sync after some time.

In one embodiment, the transmission of ping signals by the mobile terminal may be controlled by the network. For example, the base station may use an explicit polling mechanism to thereby trigger transmission of data, e.g. dummy data, from the terminal at suitable time instants. One implementation of a polling scheme may comprise to schedule a zero-sized payload in the downlink, thereby forcing the terminal to respond with a feedback signal such as an ACK (Acknowledgement) message or a NACK (Not Acknowledged) message. The timing of the polling requests may be determined as has been described above for the ping timer in the terminal. Both the ping timer in the terminal and the polling timer in the network may be used in parallel.

The technique proposed herein comprises dividing a random access procedure into at least two parts, namely a first part addressing a synchronization aspect and a second part addressing a resource admission aspect. This allows an optimization of the transmission schemes for each of the parts separately. Once synchronization has been achieved, no further synchronization request is required as long as the terminal stays in synchronization. As the access burst representing the synchronization request uses considerable transmission resources, reducing the number of synchronizations according to the technique proposed herein may save considerable transmission resources in the uplink. Resources provided at the radio interface for random access (e.g. orthogonal random access channels) can be used more efficiently. Vice versa, less resources may have to be reserved for random access. Once pure synchronization has been achieved, any further information typically provided in the uplink during a random access procedure can then be transmitted with efficient usage of the uplink resources. As synchronization and resource admission are separated, the terminal can easily be kept in a synchronization state, in case no data is available for transmission, using various resource-efficient mechanisms; for example, a ping-type signal may be used.

While the current invention has been described in relation to its preferred embodiments, it is to be understood that this disclosure is for illustrative purposes only. Accordingly, it is intended that the invention be limited only by the scope of the claims appended hereto.

The invention claimed is:

1. A method of performing a random access procedure over a radio interface, the method comprising the following steps in a mobile terminal:
    transmitting, to a radio base station, a synchronization request for synchronization information;
    receiving, from the radio base station, the synchronization information in response to the synchronization request;
    transmitting, based on at least one uplink transmission parameter adjusted in accordance with the synchronization information, a resource request for data transmission resources for uplink communications between the mobile terminal and the radio base station; and
    using a timer mechanism providing an indication related to a validity of the at least one uplink transmission parameter used by the mobile terminal to keep the mobile terminal in synchronization with the radio base station.

2. The method according to claim 1, comprising the further steps of
    receiving, from the radio bae station, resource information in response to the resource request; and
    transmitting, to the radio base station, data using resources in accordance with the resource information.

3. The method according to claim 2, comprising the step of transmitting, in case further data is to be transmitted, at least one further resource request to the radio base station.

4. The method according to claim 1, wherein using the timer mechanism comprises starting a synchronization timer in response to at least one of the reception of the synchronization information and a transmission of data to the radio base station based on the at least one uplink transmission parameter.

5. The method according to claim 4, wherein the synchronization timer is set according to a measured velocity of the mobile terminal.

6. The method according to claim 4, wherein a further synchronization request is transmitted on expiry of the synchronization timer.

7. The method according to claim 1, comprising the further step of transmitting at least one ping signal for maintaining synchronization.

8. The method according to claim 7, wherein the ping signal comprises signaling data.

9. The method according to claim 7, wherein the ping signal is transmitted on expiry of a synchronization timer.

10. The method according to claim 7, wherein the ping signal is transmitted in response to a polling request received over the radio interface.

11. A method of performing a random access procedure over a radio interface, the method comprising the following steps in a radio base station:
    receiving, from a mobile terminal, a synchronization request for synchronization information;
    transmitting, based on the synchronization request, the synchronization information to the mobile terminal; and
    receiving, based on at least one uplink transmission parameter adjusted according to the synchronization information, a resource request for data transmission resources for uplink communication between the mobile terminal and the radio base station; and
    using a timer mechanism providing an indication related to a validity of the at least one uplink transmission parameter used by the mobile terminal to keep the mobile terminal in synchronization with the radio base station.

12. The method according to claim 11, comprising the further steps of
    transmitting, to the mobile terminal, resource information in response to the resource request; and
    scheduling resources according to the resource information.

13. The method according to claim 11, comprising the step of receiving at least one further resource request from the mobile terminal.

14. The method according to claim 11, wherein using the timer mechanism comprises starting a synchronization timer in response to at least one of receiving the synchronization request, receiving the resource request, and receiving data from the mobile terminal based on the at least one uplink transmission parameter.

15. The method according to claim 14, comprising the step of transmitting, on expiry of the synchronization timer, a request for a ping signal.

16. A non-transitory computer readable recording medium storing a computer program product comprising program code portions that is executed on one or more computing devices to cause the one or more computing devices to:
    transmit, to a radio base station, a synchronization request for synchronization information;
    receive, from the radio base station, the synchronization information in response to the synchronization request;
    transmit, based on at least one uplink transmission parameter adjusted in accordance with the synchronization information, a resource request for data transmission resources for uplink communications between a mobile terminal and the radio base station; and using a timer mechanism providing an indication related to a validity of the at least one uplink transmission parameter used by the mobile terminal to keep the mobile terminal in synchronization with the radio base station.

17. A mobile terminal for performing a random access procedure over a radio interface, the mobile terminal comprising:

one or more processors coupled to a memory, the one or more processors configured to:

transmit, to a radio base station, a synchronization request for synchronization information;

receive, from the radio base station, the synchronization information in response to the synchronization request;

transmit, based on at least one uplink transmission parameter adjusted according to the synchronization information, a resource request for data transmission resources for uplink communications between the mobile terminal and the radio base station; and use a timer mechanism providing an indication related to a validity of the at least one transmission parameter used by the mobile terminal to keep the mobile terminal in synchronization with the radio base station.

18. A radio base station for performing a random access procedure over a radio interface, the base station comprising:

one or more processors coupled to a memory, the one or more processors configured to:

receive, from a mobile terminal, a synchronization request for synchronization information;

transmit, based on the synchronization request, the synchronization information to the mobile terminal; and receive, based on at least one transmission parameter adjusted according to the synchronization information, a resource request for data transmission resources for uplink communication between the mobile terminal and the radio base station; and use a timer mechanism providing an indication related to a validity of the at least one uplink transmission parameter used by the mobile terminal to keep the mobile terminal in synchronization with the radio base station.

* * * * *